(12) United States Patent
Takenaka et al.

(10) Patent No.: US 8,744,688 B2
(45) Date of Patent: Jun. 3, 2014

(54) INVERTED PENDULUM TYPE VEHICLE

(71) Applicant: Honda Motor Co., Ltd., Tokyo (JP)

(72) Inventors: Toru Takenaka, Saitama (JP); Shinya Shirokura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/771,412

(22) Filed: Feb. 20, 2013

(65) Prior Publication Data

US 2013/0304323 A1 Nov. 14, 2013

(30) Foreign Application Priority Data

May 14, 2012 (JP) .................................. 2012-111046

(51) Int. Cl.
*B62K 3/00* (2006.01)
*B62D 1/22* (2006.01)
*B62H 1/12* (2006.01)
*B62K 1/00* (2006.01)
*B62K 11/00* (2006.01)
*B60B 19/00* (2006.01)
*B60B 19/12* (2006.01)
*B62D 11/00* (2006.01)
*B62D 61/02* (2006.01)
*A61G 5/04* (2013.01)

(52) U.S. Cl.
CPC *B62H 1/12* (2013.01); *B62K 3/007* (2013.01); *B62K 1/00* (2013.01); *B62K 11/00* (2013.01); *B60B 19/003* (2013.01); *B60B 19/12* (2013.01); *B62D 1/22* (2013.01); *B62D 11/003* (2013.01); *B60B 19/00* (2013.01); *B60B 19/125* (2013.01); *B62D 61/02* (2013.01); *A61G 5/04* (2013.01)
USPC .................. 701/42; 701/22; 701/41; 180/220

(58) Field of Classification Search
CPC ............ B62H 1/12; B62K 3/007; B62K 1/00; B62K 11/00; B60B 19/003; B60B 19/12; B60B 19/00; B60B 19/125; B62D 11/003; B62D 61/02; B62D 1/22; A61G 5/04
USPC ............ 701/42, 22, 41, 69; 180/220, 21, 218, 180/7.1; 73/514.36; 280/5.23
See application file for complete search history.

(56) References Cited

U.S. PATENT DOCUMENTS

| | | |
|---|---|---|
| 8,240,407 B2 | 8/2012 | Takenaka et al. |
| 2011/0067936 A1* | 3/2011 | Takenaka et al. ............... 180/21 |
| 2011/0067940 A1* | 3/2011 | Takenaka ..................... 180/218 |
| 2011/0071715 A1 | 3/2011 | Akimoto et al. |

FOREIGN PATENT DOCUMENTS

| | | |
|---|---|---|
| JP | 2011-068165 A | 4/2011 |
| WO | 2008/139740 A1 | 11/2008 |

OTHER PUBLICATIONS

EP Office Action issued in the counterpart EP patent application 13 156 767.9 and dated Jan. 13, 2014.

* cited by examiner

*Primary Examiner* — Marthe Marc-Coleman
(74) *Attorney, Agent, or Firm* — Carrier Blackman & Associates, P.C.; Joseph P. Carrier; William D. Blackman

(57) ABSTRACT

An inverted pendulum type vehicle has a first travel operation unit and a second travel operation unit. A controller of the inverted pendulum type vehicle controls an actuator on the basis of a restricted desired value. The restricted desired value is obtained by restricting a basic desired value of the lateral travel velocity of the second travel operation unit by a limiting processor, the basic desired value being for bringing the actual turn angular velocity of the vehicle close to a desired value. The limit width of the limiting processor is variably set according to the actual travel velocity of the second travel operation unit.

16 Claims, 8 Drawing Sheets

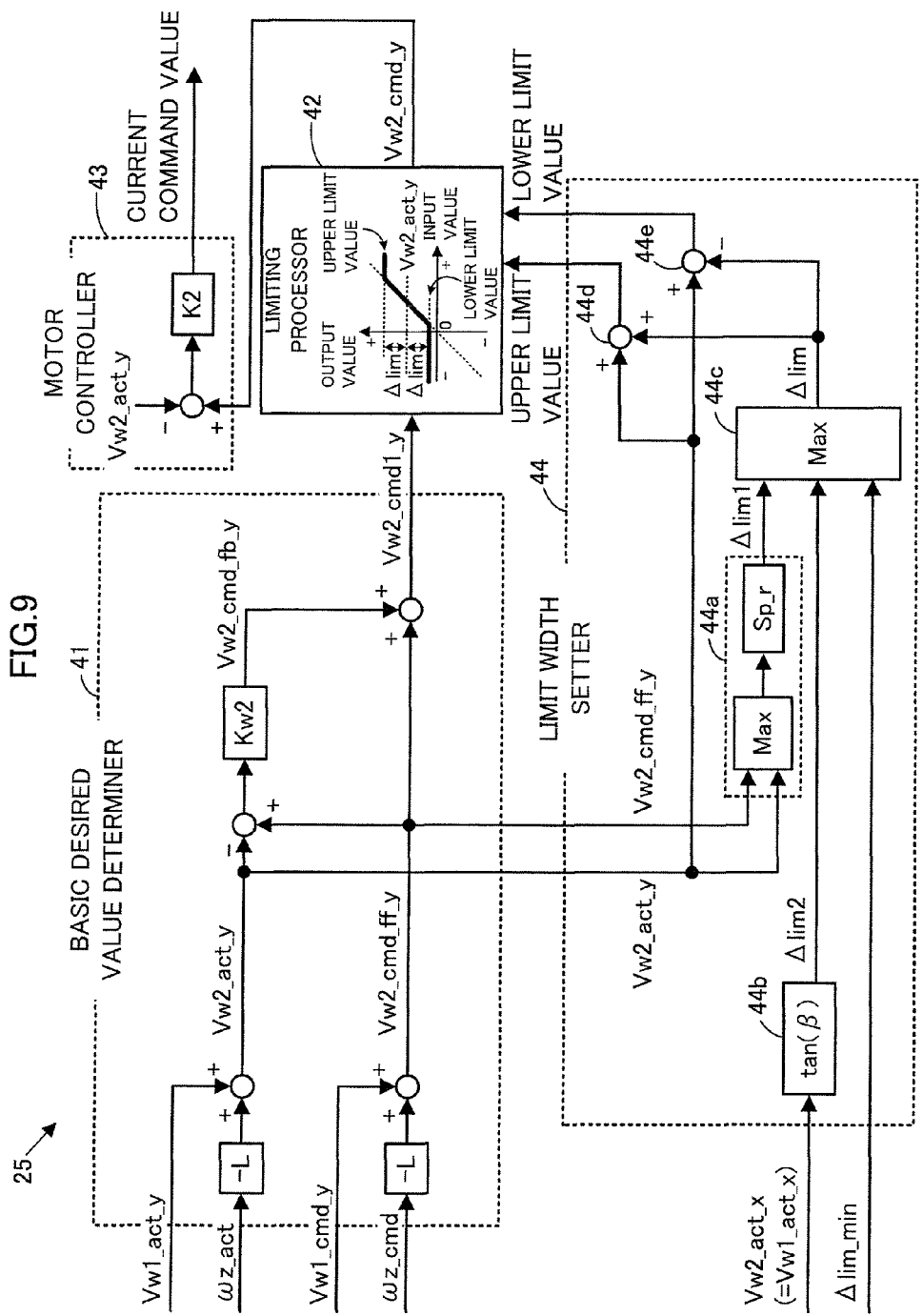

INVERTED PENDULUM TYPE VEHICLE

BACKGROUND OF THE INVENTION

1. Field of the Invention

The present invention relates to an inverted pendulum type vehicle capable of traveling on a floor surface.

2. Description of the Related Art

There has conventionally been known an inverted pendulum type vehicle in which a rider mounting section tiltable relative to the vertical direction is attached to a base body, to which a travel operation unit that travels on a floor surface and an actuator that drives the travel operation unit are installed. The inverted pendulum type vehicle is configured to control the traveling motion of the travel operation unit by moving the supporting point of an inverted pendulum.

In, for example, Japanese Patent Application Laid-Open No. 2011-068165 (hereinafter referred to as Patent Document 1), an inverted pendulum type vehicle in which a travel operation unit is driven according to the tilt or the like of a rider mounting section thereby to permit travel on a floor surface in all directions, including the longitudinal direction and the lateral direction relative to a rider, has been proposed by the applicant of the present application.

The conventional inverted pendulum type vehicle disclosed in Patent Document 1 enables the rider to turn the vehicle by moving his/her upper body so as to gradually change the traveling direction of the vehicle. Generally, however, the rider has been required to have a high steering skill to accomplish a smooth turn.

Especially when the vehicle is traveling forward at a low velocity or when the vehicle is almost in a stopped state, it has been difficult even for a skilled rider to turn the vehicle, i.e., to change the direction thereof.

To overcome the aforesaid shortcoming, the inventors of the present application have created a vehicle, in which an inverted pendulum type vehicle is additionally provided with an auxiliary second travel operation unit, which is separate from the aforesaid travel operation unit (hereinafter referred to as "the first travel operation unit" in some cases) and which is spaced from the first travel operation unit in the longitudinal direction. The inventors of the present application have also been engaged in the development of an art, in which, if there is a request for turning the vehicle, then the travel velocity of the first travel operation unit and the travel velocity of the second travel operation unit in the lateral direction are controlled so as to be different from each other, thereby causing the vehicle to make a turn (including a direction change).

However, various experiments and studies conducted by the inventors of the present application have revealed the following inconveniences.

In the inverted pendulum type vehicle provided with the auxiliary second travel operation unit as described above, a ground contact load acting on the second travel operation unit tends to be smaller than the ground contact load acting on the first travel operation unit. This in turn tends to cause the second travel operation unit to slip.

Meanwhile, when the vehicle is turned by controlling the travel velocities of the first travel operation unit and the second travel operation unit in the lateral direction, it is considered preferable to carry out control so as to bring an actual angular velocity of the vehicle in the yaw direction (the direction about the yaw axis) close to a desired angular velocity as much as possible.

In this case, if the magnitude of the difference between the desired angular velocity of the vehicle at the time of turning and the measured value of the actual angular velocity of the vehicle in the yaw direction is large, then excessive acceleration or deceleration of the travel velocity of the second travel operation unit in the lateral direction is apt to result. This inconveniently leads to frequent undue slip of the second travel operation unit.

An attempt to uniformly restrict the changes in the angular velocity of the vehicle regardless of the kinetic state of the vehicle in order to overcome the aforesaid inconvenience causes undue limitation to be placed on the travel velocity of the second travel operation unit in the lateral direction. This inconveniently results in impaired responsiveness of the turning behavior of the vehicle or a narrowed range of the travel velocity (the velocity in the longitudinal direction) of the vehicle that permits a smooth turning behavior.

SUMMARY OF THE INVENTION

The present invention has been made with a view toward overcoming the drawbacks of the prior art described above, and an object thereof is to provide an inverted pendulum type vehicle capable of properly preventing undue slip of a second travel operation unit to permit a smooth turn while preventing undue restrictions on the travel velocity of the second travel operation unit in the lateral direction when the inverted pendulum type vehicle turns.

To this end, an inverted pendulum type vehicle in accordance with the present invention has at least a first travel operation unit capable of traveling on a floor surface, a first actuator that drives the first travel operation unit, a base body to which the first travel operation unit and the first actuator are installed, and a rider mounting section attached to the base body such that the rider mounting section is tiltable relative to a vertical direction, wherein the first travel operation unit is configured to be capable of traveling in all directions, including a longitudinal direction and a lateral direction relative to a rider on the rider mounting section, by a driving force of the first actuator, the inverted pendulum type vehicle comprising:

a second travel operation unit, which is connected to the first travel operation unit or the base body with an interval provided from the first travel operation unit in the longitudinal direction and which is configured to be capable of traveling in all directions on a floor surface;

a second actuator which generates a driving force for causing the second travel operation unit to travel in at least the lateral direction; and a control unit, which controls the first actuator and the second actuator so as to cause the first travel operation unit and the second travel operation unit to carry out travel motions thereof according to at least the tilt of the rider mounting section and to set the travel velocities of the first travel operation unit and the second travel operation unit in the lateral direction to be different from each other in the case where there is a request for turning the inverted pendulum type vehicle, wherein the control unit comprises a basic desired value determining unit which determines a basic desired value of a travel velocity of the second travel operation unit in the lateral direction on the basis of at least a desired value of an angular velocity in the direction about a yaw-axis of the inverted pendulum type vehicle determined according to the request at least at the time of turning of the inverted pendulum type vehicle, a limitation processing unit configured to determine a restricted desired value as a value obtained by restricting the basic desired value by limitation processing for restricting the magnitude of a difference before limitation, which is a difference between the basic desired value and an observed value of a lateral actual travel velocity, which is an actual travel velocity of the second travel operation unit in the lateral direction, or a substitute estimated value of the observed value, to a magnitude of a predetermined limit width or less, an actuator control unit which controls the second actuator on the basis of the restricted desired value, and a limit width setting unit configured to variably set the limit width such that the limit width is changed according to at least the observed value of an actual travel velocity of the second travel operation unit or the substitute estimated value of the observed value (a first aspect of the invention).

In the present invention, the term "observed value" related to an arbitrary state amount, such as a travel velocity, means a detection value of the state amount by an appropriate sensor or an estimated value that has been estimated on the basis of specific correlativity of a detection value or values of one or more state amounts that have the specific correlativity with the aforesaid state amount.

Further, term "the substitute estimated value" of "the observed value" is not the observed value itself; however, it means, in principle, the value of an arbitrary parameter that can be expected to take a value that is substantially the same as the observed value. For example, in the case where the aforesaid state amount is controlled to a certain desired value with high following capability, the desired value (the desired value that has been determined) can be adopted as the substitute estimated value.

According to the first aspect of the invention, if there is the request for turning the inverted pendulum type vehicle (hereinafter referred to simply as "the vehicle" in some cases), then the control unit controls the first actuator and the second actuator such that the travel velocities of the first travel operation unit and the second travel operation unit in the lateral direction differ from each other. This allows the vehicle to make a turn (including a direction change).

At the time of turning, the control unit determines the basic desired value of the travel velocity of the second travel operation unit in the lateral direction by the basic desired value determining unit. The basic desired value is determined on the basis of at least the desired value of the angular velocity in the direction about the yaw axis of the inverted pendulum type vehicle determined according to the request.

Further, the control unit determines the restricted desired value as the value after restricting the basic desired value by the limitation processing carried out by the limitation processing unit. The limitation processing restricts the magnitude of a difference before limitation, which is a difference between a basic desired value and an observed value of a lateral actual travel velocity of the second travel operation unit or a substitute estimated value of the observed value, to a magnitude of a predetermined limit width or less.

More specifically, if the magnitude of the difference before limitation is the aforesaid limit width or less, then the basic desired value is directly determined as the restricted desired value. If the magnitude of the difference before limitation is larger than the limit width, then a value that causes the difference from the observed value of the lateral actual travel velocity or the substitute estimated value of the observed value to be the limit width or less will be determined as a restricted desired value.

The control unit then controls the second actuator on the basis of the restricted desired value so as to control the lateral actual travel velocity of the second travel operation unit to follow the restricted desired value.

The travel velocity of the first travel operation unit in the lateral direction may be controlled through the first actuator to an appropriate desired velocity determined on the basis of, for example, the desired value of the angular velocity.

In this case, the control unit variably controls the limit width by the limit width setting unit such that the limit width is changed on the basis of at least the observed value of the actual travel velocity of the second travel operation unit or the substitute estimated value of the observed value.

This arrangement makes it possible to set a limit width suited to the actual travel velocity (e.g., the travel velocity in the lateral direction or the longitudinal direction) of the second travel operation unit.

Thus, a restricted desired value can be determined without placing excessive restriction on the basic desired value for making the actual angular velocity of the vehicle follow a desired value while restraining the magnitude of the restricted desired value from becoming excessively large.

The first aspect of the invention, therefore, permits a smooth turn while properly preventing undue slip of the second travel operation unit and also preventing excessive restriction from being placed on the lateral travel velocity of the second travel operation unit when the inverted pendulum type vehicle turns.

In the first aspect of the invention, the basic desired value determining unit is preferably configured to determine the basic desired value by using feedback control processing for reducing an angular velocity difference, which is a difference between a desired value of the angular velocity and an observed value of an actual value of the angular velocity, close to zero (a second aspect of the invention).

The second aspect of the invention allows an actual angular velocity to follow a desired value of the angular velocity more successfully.

In the first or the second aspect of the invention, the limit width setting unit preferably sets the limit width such that the limit width is changed on the basis of at least the observed value of the lateral actual travel velocity or the substitute estimated value of the observed value (a third aspect of the invention).

The third aspect of the invention makes it possible to set the permissible limit of the slip ratio of the second travel operation unit in the lateral direction on the basis of the lateral actual travel velocity of the second travel operation unit.

More specifically, in the third aspect of the invention, the limit width setting unit preferably sets the limit width such that the limit width increases as the absolute value of the observed value of the lateral actual travel velocity or the absolute value of the substitute estimated value of the observed value increases (a fourth aspect of the invention).

According the fourth aspect of the invention, the occurrence of an undue slip of the second travel operation unit in the lateral direction can be securely prevented by controlling the slip ratio of the second travel operation unit in the lateral direction to a proper permissible range.

Further, in the second aspect of the invention, in the case where the basic desired value determining unit is a unit that determines the basic desired value by adding up a feedforward component of the basic desired value determined on the basis of at least a desired value of the angular velocity and a feedback component of the basic desired value determined by feedback control processing for reducing the angular velocity difference close to zero, the limit width setting unit preferably sets the limit width such that the limit width is changed on the basis of at least one of the observed value of the lateral actual travel velocity or the substitute estimated value of the observed value and the feedforward component (a fifth aspect of the invention).

The fifth aspect of the invention makes it possible to set the limit width by reflecting the feedforward component, which is a target of the lateral actual travel velocity, in addition to the observed value of the lateral actual travel velocity or the substitute estimated value of the observed value.

For example, the limit width setting unit sets the limit width such that the limit width is changed on the basis of one of the observed value of the lateral actual travel velocity or the substitute estimated value of the observed value and the feedforward component, whichever has a larger absolute value (a sixth aspect of the invention).

Thus, the limit width can be set with the feedforward component effectively reflected thereon even in a transient situation wherein the feedforward component and the observed value of the lateral actual travel velocity or the substitute estimated value of the observed value significantly differ from each other at the time of, for example, starting a turn of the vehicle.

In the fifth or the sixth aspect of the invention, more specifically, the limit width setting unit preferably sets the limit width such that the limit width increases as an absolute value of the observed value of the lateral actual travel velocity or the substitute estimated value of the observed value, or the absolute value of the feedforward component, whichever has a larger absolute value, increases (a seventh aspect of the invention).

The seventh aspect of the invention is capable of providing the same advantages as those of the fourth aspect of the invention. In addition, it is possible to prevent the limit width from becoming excessively small in a transient situation wherein the feedforward component and the observed value of the lateral actual travel velocity or the substitute estimated value of the observed value significantly differ from each other at the time of, for example, starting a turn of the vehicle. This makes it possible to prevent the restricted desired value from being unduly restricted with respect to the basic desired value, thus permitting a smooth turning start of the vehicle.

Further, in the first or the second aspect of the invention, the limit width setting unit preferably sets the limit width such that the limit width is changed on the basis of the observed value of the lateral actual travel velocity or the substitute estimated value of the observed value and an observed value of a longitudinal actual travel velocity, which is an actual travel velocity of the second travel operation unit in the longitudinal direction, or a substitute estimated value of the observed value (an eighth aspect of the invention).

According to the eighth aspect of the invention, the limit width can be set by reflecting the observed value of a longitudinal actual travel velocity of the second travel operation unit or a substitute estimated value of the observed value in addition to the observed value of the lateral actual travel velocity of the second travel operation unit or the substitute estimated value of the observed value.

Hence, a permissible limit of a sideslip angle of the second travel operation unit can be set in addition to a permissible limit of the slip ratio of the second travel operation unit in the lateral direction.

In the eighth aspect of the invention, the limit width setting unit preferably has a first candidate value determining unit which determines a first candidate value of the limit width on the basis of the observed value of the lateral actual travel velocity or the substitute estimated value of the observed value and a second candidate value determining unit which determines a second candidate value of the limit width on the basis of the observed value of the longitudinal actual travel velocity or the substitute estimated value of the observed value, and sets the limit width to a magnitude equal to or more than the first candidate value or the second candidate value, whichever is larger (a ninth aspect of the invention).

The ninth aspect of the invention makes it possible to prevent the slip ratio and the sideslip angle of the second travel operation unit from being unduly restricted.

In the ninth aspect of the invention, more specifically, the first candidate value determining unit preferably determines the first candidate value such that the first candidate value increases as the absolute value of the observed value of the lateral actual travel velocity or the substitute estimated value of the observed value increases, and the second candidate value determining unit preferably determines the second candidate value such that the second candidate value increases as the absolute value of the observed value of the longitudinal actual travel velocity or the substitute estimated value of the observed value increases (a tenth aspect of the invention).

The tenth aspect of the invention makes it possible to prevent the occurrence of an excessive slip of the second travel operation unit by controlling the slip ratio of the second travel operation unit in the lateral direction to a proper permissible range at the time of turning in a state wherein the longitudinal travel velocity of the vehicle is relatively low.

Further, at the time of turning in a state wherein the longitudinal travel velocity of the vehicle is relatively low, it is possible to prevent the sideslip angle of the second travel operation unit from becoming excessively large while at the same time preventing the sideslip of the second travel operation unit, which is necessary for the turning, from being unduly restricted.

In the fifth aspect of the invention, the limit width setting unit preferably sets the limit width such that the limit width is changed on the basis of at least one of the observed value of the lateral actual travel velocity or the substitute estimated value of the observed value and the feedforward component and the observed value of a longitudinal actual travel velocity, which is the actual travel velocity of the second travel operation unit in the longitudinal direction, or the substitute estimated value of the observed value (an eleventh aspect of the invention).

According to the eleventh aspect of the invention, the limit width can be set, reflecting the observed value of a longitudinal actual travel velocity of the second travel operation unit or the substitute estimated value of the observed value in addition to the observed value of the lateral actual travel velocity or the substitute estimated value of the observed value and the feedforward component, which is the target of the lateral actual travel velocity.

This arrangement makes it possible to set the permissible limit of the sideslip of the second travel operation unit in addition to the permissible limit of the slip ratio of the second travel operation unit in the lateral direction.

In the eleventh aspect of the invention, the limit width setting unit preferably has a first candidate value determining unit configured to determine a first candidate value of the limit width on the basis of at least one of the observed value of the lateral actual travel velocity or the substitute estimated value of the observed value and the feedforward component and a second candidate value determining unit configured to determine a second candidate value of the limit width on the basis of the observed value of the longitudinal actual travel velocity or the substitute estimated value of the observed value, and sets the limit width to a magnitude equal to or more than the first candidate value or the second candidate value, whichever is larger (a twelfth aspect of the invention).

The twelfth aspect of the invention makes it possible to prevent the slip ratio and the sideslip angle of the second travel operation unit from being unduly restricted.

In the twelfth aspect of the invention, more specifically, the first candidate value determining unit preferably determines the first candidate value such that the first candidate value increases as the absolute value of the observed value of the lateral actual travel velocity or the substitute estimated value of the observed value or the absolute value of the feedforward component, whichever is larger, increases, and the second candidate value determining unit preferably determines the second candidate value such that the second candidate value increases as the absolute value of the observed value of the longitudinal actual travel velocity or the substitute estimated value of the observed value increases (a thirteenth aspect of the invention).

As with the ninth aspect of the invention, the thirteenth aspect of the invention makes it possible to control the slip ratio of the second travel operation unit in the lateral direction to a proper permissible range at the time of turning in a state wherein the longitudinal travel velocity of the vehicle is relatively low. This makes it possible to prevent the occurrence of an excessive slip of the second travel operation unit.

Further, at the time of turning in a state wherein the longitudinal travel velocity of the vehicle is relatively low, it is possible to prevent the sideslip angle of the second travel operation unit from becoming excessively large while at the same time preventing the sideslip of the second travel operation unit, which is necessary for the turning, from being unduly restricted.

Further, in the first or the second aspect of the invention, the limit width setting unit preferably sets the limit width such that the limit width is changed on the basis of at least the observed value of the longitudinal actual travel velocity, which is the actual travel velocity of the second travel operation unit in the longitudinal direction, or the substitute estimated value of the observed value (a fourteenth aspect of the invention).

The fourteenth aspect of the invention makes it possible to set the permissible limit of the sideslip angle of the second travel operation unit on the basis of the longitudinal actual travel velocity of the second travel operation unit when the vehicle makes a turn while traveling in the longitudinal direction.

In the fourteenth aspect of the invention, more specifically, the limit width setting unit preferably sets the limit width such that the limit width increases as the absolute value of the observed value of the longitudinal actual travel velocity or the substitute estimated value of the observed value increases (a fifteenth aspect of the invention).

The fifteenth aspect of the invention is capable of controlling the sideslip angle of the second travel operation unit to a proper permissible range when the vehicle makes a turn while traveling in the longitudinal direction. This makes it possible to securely prevent the occurrence of an excessive sideslip of the second travel operation unit.

In any one of the first to the fifteenth aspect of the invention, the limit width setting unit preferably sets the limit width such that the limit width is restricted to a value that is larger than zero and has a magnitude equal to or more than a predetermined minimum limit width (a sixteenth aspect of the invention).

The sixteenth aspect of the invention makes it possible to securely prevent the restricted desired value from being unduly limited with respect to the basic desired value. As a result, a smooth turn of the vehicle can be further securely achieved.

BRIEF DESCRIPTION OF THE DRAWINGS

FIG. 9 is a block diagram illustrating the processing by a second control processor shown in FIG. 3.

DESCRIPTION OF THE PREFERRED EMBODIMENTS

Figure 1:
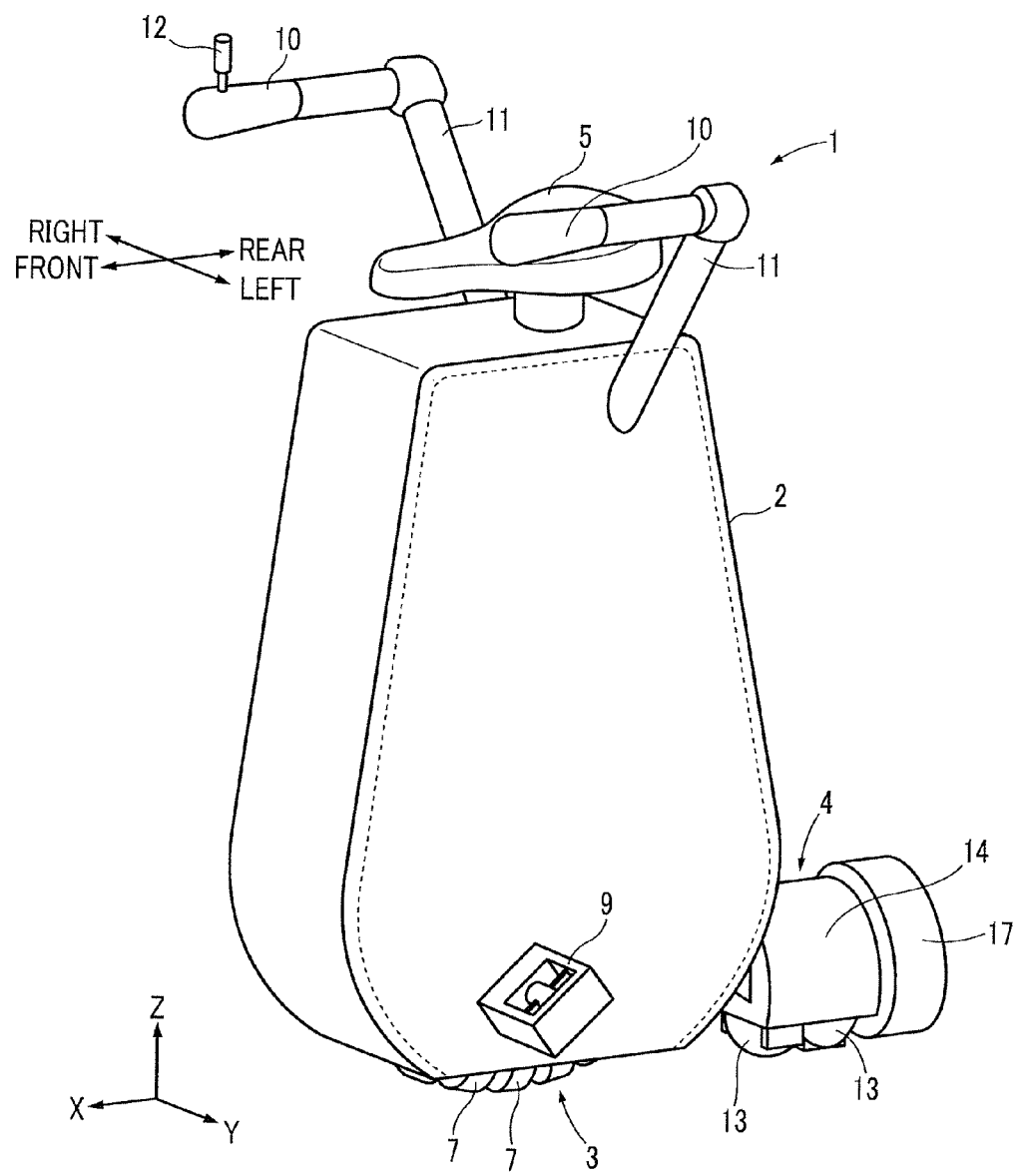
FIG. 1 is a perspective view illustrating the appearance of an inverted pendulum type vehicle according to an embodiment of the present invention.
Figure 2:
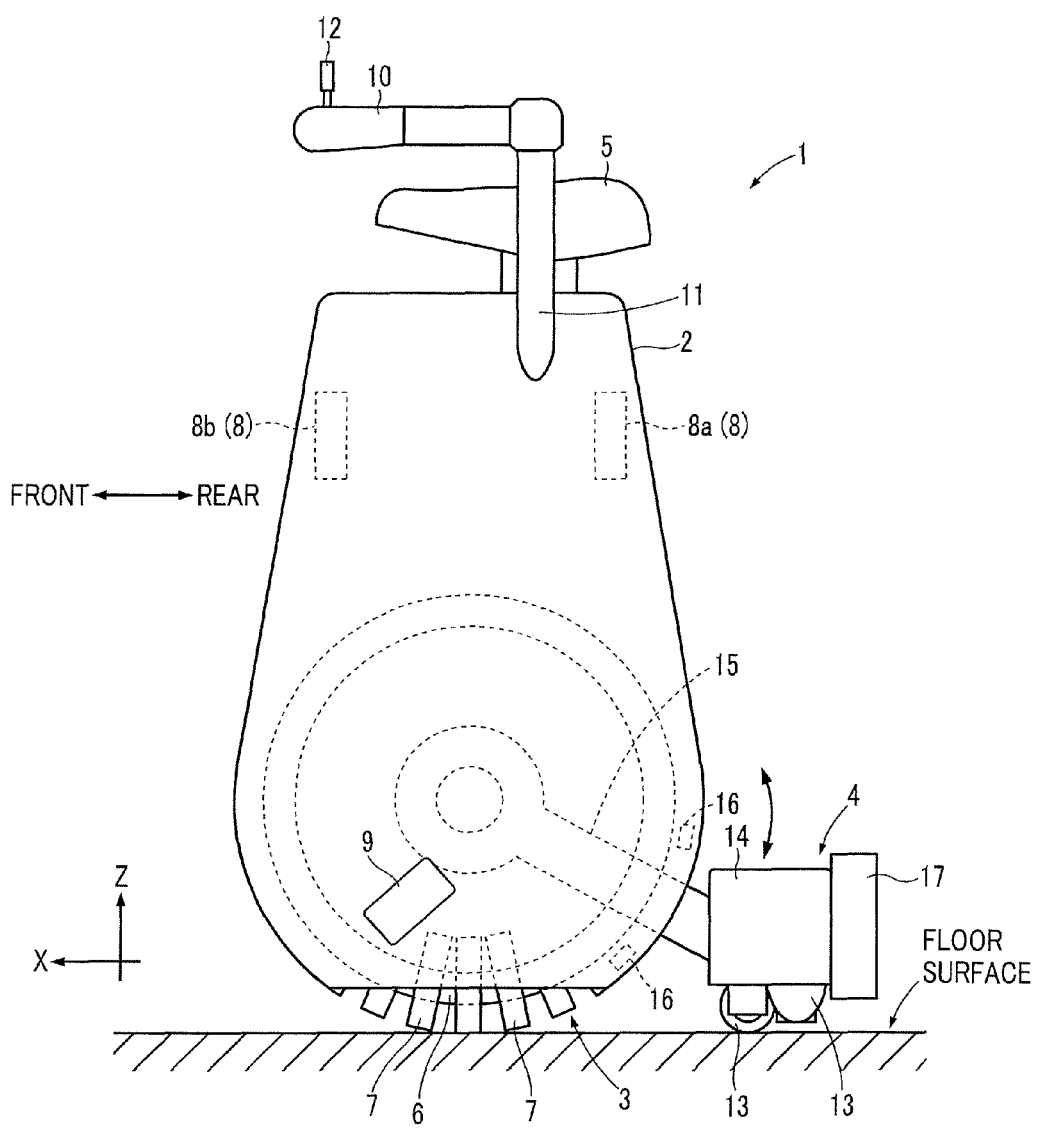
FIG. 2 is a side view of the inverted pendulum type vehicle according to the embodiment.

An embodiment of the present invention will be described with reference to FIG. 1 to FIG. 9. As illustrated in FIG. 1 and FIG. 2, an inverted pendulum type vehicle 1 according to the present embodiment (hereinafter referred to simply as the vehicle 1 in some cases) has a base body 2, a first travel operation unit 3 and a second travel operation unit 4, which are capable of traveling on a floor surface, and a rider mounting section 5 on which a rider mounts.

The first travel operation unit 3 includes a circular core member 6 shown in FIG. 2 (hereinafter referred to as the annular core member 6) and a plurality of circular rollers 7 mounted on the annular core member 6 such that the circular rollers 7 are arranged at equiangular intervals in the circumferential direction (in the direction about the axial center) of the annular core member 6. Each of the rollers 7 is externally inserted into the annular core member 6 with its rotational axial center directed toward the circumference of the annular core member 6. Further, each of the rollers 7 is configured to be rotatable integrally with the annular core member 6 about the axial center of the annular core member 6. In addition, each of the rollers 7 is configured to be rotatable about the central axis of the cross-sectional plane of the annular core member 6 (the circumferential axis about the axial center of the annular core member 6).

The first travel operation unit 3 having the annular core member 6 and the plurality of the rollers 7 comes in contact with a floor surface through the intermediary of the rollers 7 (the rollers 7 positioned in a lower portion of the annular core member 6), the axial center of the annular core member 6 being directed in parallel to the floor surface. In this ground contact state, the annular core member 6 is rotatively driven about the axial center thereof so as to cause all the annular core member 6 and the rollers 7 to circumrotate. This in turn causes the first travel operation unit 3 to travel on the floor surface in a direction orthogonal to the axial center of the annular core member 6. In the ground contact state, rotatively driving the rollers 7 about their rotational axial centers causes the first travel operation unit 3 to travel in the direction of the axial center of the annular core member 6.

Further, rotatively driving the annular core member 6 and rotatively driving the rollers 7 cause the first travel operation unit 3 to travel in a direction at an angle with respect to the direction orthogonal to the axial center of the annular core member 6 and the direction of the axial center of the annular core member 6.

Thus, the first travel operation unit 3 is capable of traveling on the floor surface in all directions. In the following description, of the traveling directions of the first travel operation unit 3, the direction orthogonal to the axial center of the annular core member 6 is defined as X-axis direction, the direction of the axial center of the annular core member 6 is defined as Y-axis direction, and a vertical direction is defined as Z-axis direction, as illustrated in FIG. 1 and FIG. 2. In addition, a front direction is defined as the positive direction of the X-axis, a left direction is defined as the positive direction of the Y-axis, and an upper direction is defined as a positive direction of the Z-axis.

The first travel operation unit 3 is installed to the base body 2. More specifically, the base body 2 is provided, covering the first travel operation unit 3 except for a lower portion thereof in contact with the floor surface. Further, the base body 2 supports the annular core member 6 of the first travel operation unit 3 such that the annular core member 6 is rotatable about the axial center thereof.

In this case, the base body 2 uses the axial center of the annular core member 6 of the first travel operation unit 3 as the supporting point thereof and the base body 2 can be tilted about the axial center (about the Y-axis). Further, the base body 2 is tiltable about the X-axis orthogonal to the axial center of the annular core member 6 by tilting together with the first travel operation unit 3 relative to the floor surface, the ground contact portion of the first travel operation unit 3 being the supporting point. Thus, the base body 2 is tiltable about two axes relative to the vertical direction.

The base body 2 includes therein a first actuator 8, which generates a driving force for moving the first travel operation unit 3, as illustrated in FIG. 2. The first actuator 8 is constituted of an electric motor 8a serving as the actuator that rotatively drives the annular core member 6 and an electric motor 8b serving as the actuator that rotatively drives the rollers 7. The electric motors 8a and 8b impart rotative driving forces to the annular core member 6 and the rollers 7 through the intermediary of a motive power transmitting mechanisms (not shown). The motive power transmitting mechanisms may have publicly known constructions.

The first travel operation unit 3 may have a construction different from the aforesaid construction. For example, the first travel operation unit 3 and the driving system thereof may adopt the constructions proposed by the applicant of the present application in PCT WO/2008/132778 or PCT WO/2008/132779.

Further, the rider mounting section 5 is installed to the base body 2. The rider mounting section 5 is formed of a seat, on which a rider sits, and fixed to the upper end portion of the base body 2. A rider can sit on the rider mounting section 5, the longitudinal direction thereof being the X-axis direction and the lateral direction thereof being the Y-axis direction. The rider mounting section 5 (the seat) is secured to the base body 2, so that the rider mounting section 5 can be tilted integrally with the base body 2 relative to the vertical direction.

Further attached to the base body 2 are a pair of footrests 9 and 9, on which the rider sitting on the rider mounting section 5 places his/her feet, and a pair of handles 10 and 10 held by the rider.

The footrests 9 and 9 are protrusively provided in lower portions of both sides of the base body 2. In FIG. 1 and FIG. 2, one (the right one) of the footrests 9 is not shown.

The handles 10 and 10 are formed of bar-like members disposed extendedly in the X-axis direction (the longitudinal direction) on both sides of the rider mounting section 5. The handles 10 and 10 are respectively fixed to the base body 2 through rods 11 extended from the base body 2. Further, a joystick 12 serving as an operation device is attached to one handle 10 (the right handle 10 in the drawing) of the pair of handles 10 and 10.

The joystick 12 can be swung in the longitudinal direction (the X-axis direction) and the lateral direction (the Y-axis direction). The joystick 12 outputs an operation signal indicative of the amount of swing in the longitudinal direction (the X-axis direction) as a command for moving the vehicle 1 forward or backward. The joystick 12 also outputs an operation signal indicative of the amount of swing in the lateral direction (the Y-axis direction) as a command for turning the vehicle 1 to the right (clockwise) or the left (counterclockwise), i.e., a turning command. Regarding the amount of swing of the joystick 12 in the longitudinal direction, i.e., the amount of rotation about the Y-axis, in the present embodiment, the amount of a forward swing is positive, while the amount of a backward swing is negative. Regarding the amount of a lateral swing of the joystick 12, i.e., the amount of rotation about the X-axis, the amount of a leftward swing is positive, while the amount of a rightward swing is negative.

The second travel operation unit 4 in the present embodiment is formed of a so-called omniwheel. The omniwheel constituting the second travel operation unit 4 has a publicly known structure, which includes a pair of coaxial annular core members (not shown) and a plurality of barrel-like rollers 13 rotatably and externally inserted in each of the annular core members with the rotational axial centers thereof oriented in the circumferential direction of the annular core member.

In this case, the second travel operation unit 4 is disposed at the rear of the first travel operation unit 3 with the axial centers of the pair of annular core members thereof oriented in the X-axis direction (the longitudinal direction). Further, the second travel operation unit 4 is in contact with a floor surface through the rollers 13.

The roller 13 of one of the pair of annular core members and the roller 13 of the other thereof are arranged such that the phases thereof are shifted in the peripheral directions of the annular core members. The rollers 13 are further configured such that either the roller 13 of one of the pair of annular core members or the roller 13 of the other thereof comes in contact with the floor surface when the pair of annular core members rotates.

The second travel operation unit 4 constituted of the omniwheel is joined to the base body 2. More specifically, the second travel operation unit 4 is provided with a housing 14 that covers an upper portion of the omniwheel (all the pair of annular core members and the plurality of the rollers 13). The pair of annular core members of the omniwheel is rotatably supported by the housing 14 such that the pair of annular core members is rotatable about the axial centers thereof. Further, an arm 15 extended from the housing 14 to the base body 2 is rotatably supported by the base body 2 such that the arm 15 is swingable about the axial center of the annular core member 6 of the first travel operation unit 3. Thus, the second travel operation unit 4 is joined to the base body 2 through the arm 15.

Further, the second travel operation unit 4 is swingable, relative to the base body 2, about the axial center of the annular core member 6 of the first travel operation unit 3 by the swing of the arm 15. This allows the rider mounting section 5 to tilt together with the base body 2 about the Y-axis while maintaining both the first travel operation unit 3 and the second travel operation unit 4 to be in contact with the ground.

Alternatively, the arm 15 may be rotatably supported by the axial center portion of the annular core member 6 of the first travel operation unit 3, and the second travel operation unit 4 may be joined to the first travel operation unit 3 through the arm 15.

The base body 2 is provided with a pair of stoppers 16 and 16 that restricts the swing range of the arm 15. The arm 15 is allowed to swing within the range defined by the stoppers 16 and 16. This restricts the swing range of the second travel operation unit 4 about the axial center of the annular core member 6 of the first travel operation unit 3 and consequently the range of tilt of the base body 2 and the rider mounting section 5 about the X-axis. As a result, the base body 2 and the rider mounting section 5 are prevented from excessively tilting toward the rear side of the rider.

The second travel operation unit 4 may be urged by a spring so as to be pressed against the floor surface.

As described above, the second travel operation unit 4 is capable of traveling on the floor surface in all directions, including the X-axis direction and the Y-axis direction, as with the first travel operation unit 3, by rotating one or both of the pair of annular core members and the rollers 13. More specifically, the rotation of the annular core members enables the second travel operation unit 4 to travel in the Y-axis direction, i.e., the lateral direction. Further, the rotation of the rollers 13 enables the second travel operation unit 4 to travel in the X-axis direction, i.e., the longitudinal direction.

An electric motor 17 serving as the second actuator, which drives the second travel operation unit 4, is attached to the housing 14 of the second travel operation unit 4. The electric motor 17 is joined to the pair of annular core members so as to rotatively drive the pair of annular core members of the second travel operation unit 4.

Thus, according to the present embodiment, the travel of the second travel operation unit 4 in the X-axis direction is adapted to passively follow the travel of the first travel operation unit 3 in the X-axis direction. Further, the travel of the second travel operation unit 4 in the Y-axis direction is implemented by rotatively driving the pair of annular core members of the second travel operation unit 4 by the electric motor 17.

Supplementarily, the second travel operation unit 4 may have the same construction as that of the first travel operation unit 3.

The above has described the mechanical configuration of the vehicle 1 according to the present embodiment.

Figure 3:
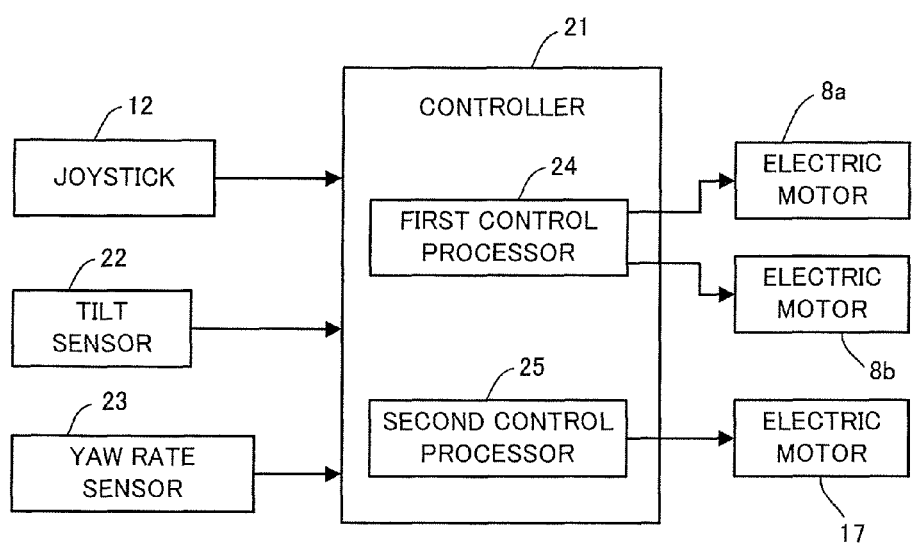
FIG. 3 is a block diagram illustrating the configuration for controlling the inverted pendulum type vehicle according to the embodiment.

Although not shown in FIG. 1 and FIG. 2, in order to control the operation of the vehicle 1, i.e., to control the operations of the first travel operation unit 3 and the second travel operation unit 4, the base body 2 of the vehicle 1 in the present embodiment incorporates a controller 21 constituted of an electronic circuit unit, which includes a CPU, a RAM, a ROM and the like, a tilt sensor 22 for measuring the tilt angle of the rider mounting section 5 (the tilt angle of the base body 2) relative to the vertical direction, and a yaw rate sensor 23 for measuring the angular velocity of the vehicle 1 about the yaw axis, as illustrated in FIG. 3.

The controller 21 receives the outputs of the joystick 12 and detection signals of the tilt sensor 22 and the yaw rate sensor 23.

The controller 21 may alternatively be constituted of a plurality of electronic circuit units adapted to communicate with each other.

The tilt sensor 22 is constituted of, for example, an acceleration sensor and an angular velocity sensor, such as a gyro sensor. The controller 21 uses a publicly known method to acquire the measurement value of the tilt angle of the rider mounting section 5, i.e., the tilt angle of the base body 2, from the detection signals of the acceleration sensor and the angular velocity sensor. As the method, the one proposed by the applicant of the present application in, for example, Japanese Patent No. 4181113 may be used.

More specifically, the tilt angle of the rider mounting section 5 (or the tilt angle of the base body 2) in the present embodiment is the tilt angle (a set of a tilt angle in the direction about the X-axis and a tilt angle in the direction about the Y-axis), which uses, as its reference (zero), the posture of the rider mounting section 5 (or the base body 2) in a state wherein the center of gravity of the combination of the vehicle 1 and the rider mounted on the rider mounting section 5 in a predetermined posture (standard posture) is positioned right above the ground contact portion of the first travel operation unit 3 (upward in the vertical direction).

The yaw rate sensor 23 is composed of an angular velocity sensor, such as a gyro sensor. Based on a detection signal of the yaw rate sensor 23, the controller 21 acquires the measurement value of the angular velocity of the vehicle 1 about the yaw axis.

The controller 21 corresponds to the control unit in the present invention. To provide a function implemented by an installed program or the like (a function implemented by software) or a function implemented by hardware in addition to the function for acquiring the measurement values as described above, the controller 21 further includes a first control processor 24, which controls the electric motors 8a and 8b constituting the first actuator 8 thereby to control the traveling motion of the first travel operation unit 3, and a second control processor 25, which controls the electric motor 17 serving as the second actuator thereby to control the traveling motion of the second travel operation unit 4.

The first control processor 24 carries out the arithmetic processing, which will be discussed hereinafter, to sequentially calculate a first desired velocity, which is the desired value of the travel velocity (more specifically, the set of a translational velocity in the X-axis direction and a translational velocity in the Y-axis direction) of the first travel operation unit 3. Then, the first control processor 24 controls the rotational speed of each of the electric motors 8a and 8b thereby to match the actual travel velocity of the first travel operation unit 3 to the first desired velocity.

In this case, the relationship between the rotational speed of each of the electric motors 8a and 8b and the actual travel velocity of the first travel operation unit 3 is established beforehand. Hence, the desired value of the rotational speed of each of the electric motors 8a and 8b is specified on the basis of the first desired velocity of the first travel operation unit 3. Then, the rotational speeds of the electric motors 8a and 8b are feedback-controlled to the desired values specified on the basis of the first desired velocity, thereby controlling the actual travel velocity of the first travel operation unit 3 to the first desired velocity.

Further, the second control processor 25 carries out the arithmetic processing, which will be discussed hereinafter, to sequentially calculate a second desired velocity, which is the desired value of the travel velocity (more specifically, the translational velocity in the Y-axis direction) of the second travel operation unit 4. Then, the second control processor 25 controls the rotational speed of the electric motor 17 thereby to match the actual travel velocity of the second travel operation unit 4 in the Y-axis direction to the second desired velocity.

In this case, the relationship between the rotational speed of the electric motor 17 and the actual travel velocity of the second travel operation unit 4 in the Y-axis direction is established beforehand, as with the case of the first travel operation unit 3. Hence, the desired value of the rotational speed of the electric motor 17 is specified on the basis of the second desired velocity of the second travel operation unit 4. Then, the rotational speed of the electric motor 17 is feedback-controlled to the desired values specified on the basis of the second desired velocity, thereby controlling the actual travel velocity of the second travel operation unit 4 in the Y-axis direction to the second desired velocity.

Supplementarily, according to the present embodiment, the travel of the second travel operation unit 4 in the X-axis direction is passively implemented by following the travel of the first travel operation unit 3 in the X-axis direction. Hence, there is no need to set the desired value of the travel velocity of the second travel operation unit 4 in the X-axis direction.

In the explanation of the embodiments in the present description, the velocity of the first travel operation unit 3 means the moving velocity of the ground contact point of the first travel operation unit 3 unless otherwise specified. Similarly, the velocity of the second travel operation unit 4 means the moving velocity of the ground contact point of the second travel operation unit 4 unless otherwise specified.

The processing by the first control processor 24 and the second control processor 25 will now be described in further detail. First, the processing by the first control processor 24 will be described with reference to FIG. 4 to FIG. 7.

Figure 4:
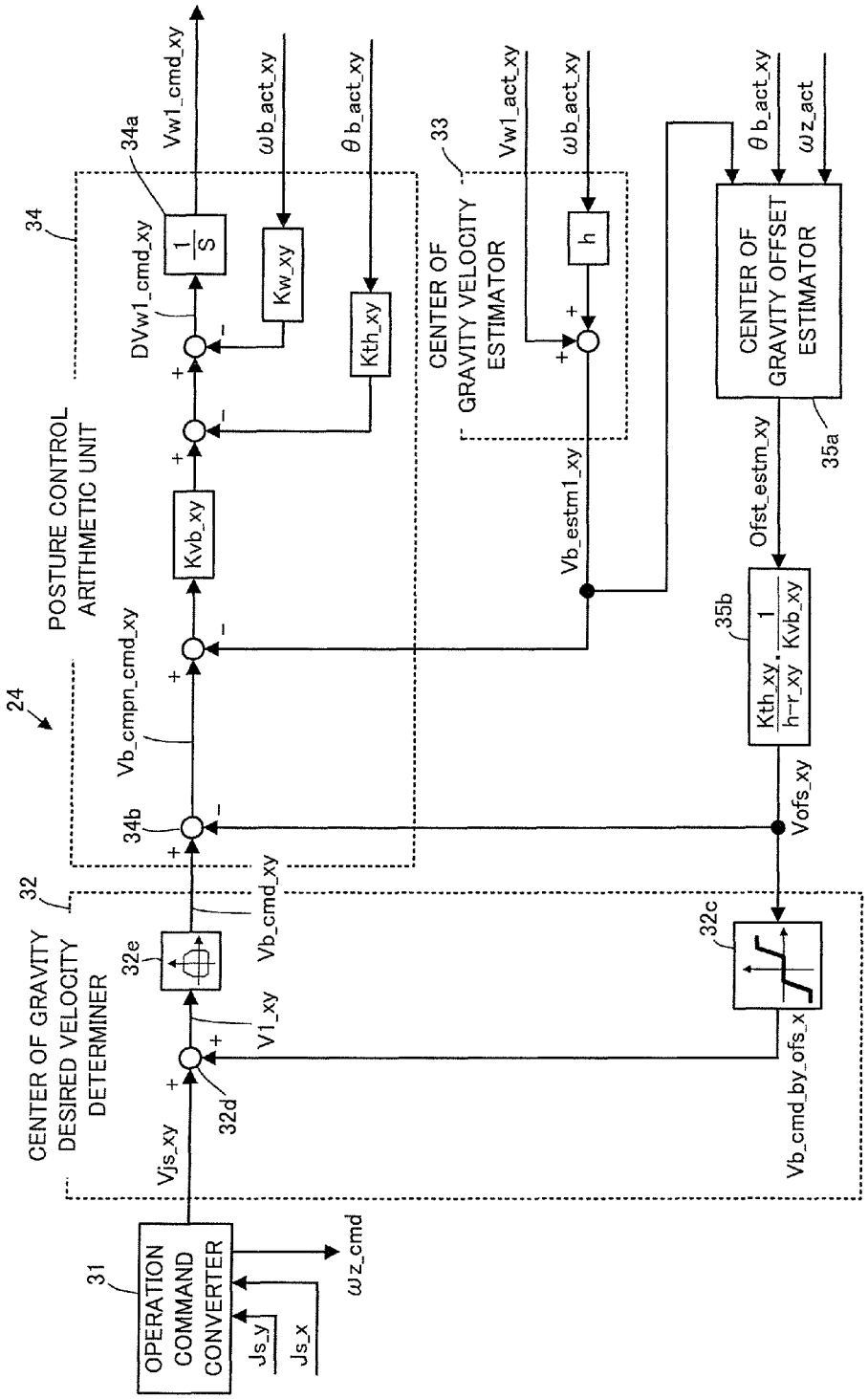
FIG. 4 is a block diagram illustrating the processing by a first control processor shown in FIG. 3.

As illustrated in FIG. 4, the first control processor 24 has, as major functional units thereof, an operation command converter 31 which converts the swing amount of the joystick 12 in the longitudinal direction (the amount of rotation about the Y-axis) Js_x and the swing amount thereof in the lateral direction (the amount of rotation about the X-axis) Js_y, which are indicated by an operation signal input from the joystick 12, into a velocity command for the travel of the vehicle 1, a center of gravity desired velocity determiner 32 which determines the desired velocity of the total center of gravity of the combination of the vehicle 1 and the rider on the rider mounting section 5 (hereinafter referred to as the vehicle system total center of gravity), a center of gravity velocity estimator 33 which estimates the velocity of the vehicle system total center of gravity, and a posture control arithmetic unit 34 which determines the desired value of the travel velocity of the first travel operation unit 3 such that the posture of the rider mounting section 5, i.e., the posture of the base body 2, is stabilized while making the estimated velocity of the vehicle system total center of gravity follow a desired velocity. The first control processor 24 carries out the processing by the aforesaid functional units at a predetermined arithmetic processing cycle of the controller 21.

In the present embodiment, the vehicle system total center of gravity has a meaning as an example of the representative point of the vehicle 1. Accordingly, the velocity of the vehicle system total center of gravity has a meaning as the translational moving velocity of the representative point.

Before specifically describing the processing carried out by each of the functional units of the first control processor 24, the basic matters of the processing will be described. The dynamic behavior of the vehicle system total center of gravity (more specifically, the behavior observed from the Y-axis direction and the behavior observed from the X-axis direction) is approximately expressed by an inverted pendulum model shown in FIG. 5. The algorithm of the processing by the first control processor 24 is created on the basis of the behavior.

In the following description and FIG. 5, a suffix "_x" means a reference code of a variable or the like observed from the Y-axis direction, while a suffix "_y" means a reference code of a variable or the like observed from the X-axis direction. Further, in FIG. 5, the reference codes of the variables observed from the Y-axis direction are not parenthesized, while the reference codes of the variables observed from the X-axis direction are parenthesized in order to illustrate both an inverted pendulum model observed from the Y-axis direction and an inverted pendulum model observed from the X-axis direction.

The inverted pendulum model expressing the behavior of the vehicle system total center of gravity observed from the Y-axis direction has a virtual wheel 61_x which has a rotational axial center parallel to the Y-axis direction and which is circumrotatable on a floor surface (hereinafter referred to as "the virtual wheel 61_x"), a rod 62_x which is extended from the rotational center of the virtual wheel 61_x and which is swingable about the rotational axis of the virtual wheel 61_x (in the direction about the Y-axis direction), and a mass point Ga_x connected to a reference portion Ps_x, which is the distal end portion (upper end portion) of the rod 62_x.

In the inverted pendulum model, it is assumed that the movement of the mass point Ga_x corresponds to the movement of the vehicle system total center of gravity observed from the Y-axis direction, and a tilt angle θb_x (the angle of a tilt in the direction about the Y-axis) of the rod 62_x relative to the vertical direction agrees with the angle of a tilt of the rider mounting section 5 (or the base body 2) in the direction about the Y-axis. Further, the translational movement of the first travel operation unit 3 in the X-axis direction corresponds to the translational movement in the X-axis direction by the circumrotation of the virtual wheel 61_x.

Further, a radius r_x of the virtual wheel 61_x and a height h_x of each of the reference portion Ps_x and the mass point Ga_x from the floor surface are set to predetermined values (fixed values) set beforehand.

Similarly, the inverted pendulum model expressing the behavior of the vehicle system total center of gravity observed from the X-axis direction has a virtual wheel 61_y which has a rotational axial center parallel to the X-axis direction and which is circumrotatable on the floor surface (hereinafter referred to as "the virtual wheel 61_y"), a rod 62_y which is extended from the rotational center of the virtual wheel 61_y and which is swingable about the rotational axis of the virtual wheel 61_y (in the direction about the X-axis direction), and a mass point Ga_y connected to a reference portion Ps_y, which is the distal end portion (upper end portion) of the rod 62_y.

In the inverted pendulum model, it is assumed that the movement of the mass point Ga_y corresponds to the movement of the vehicle system total center of gravity observed from the X-axis direction. A tilt angle θb_y (the angle of a tilt in the direction about the X-axis) of the rod 62_y relative to the vertical direction agrees with the angle of a tilt of the rider mounting section 5 (or the base body 2) in the direction about the X-axis. Further, the translational movement of the first travel operation unit 3 in the Y-axis direction corresponds to the translational movement in the Y-axis direction by the circumrotation of the virtual wheel 61_y.

Further, a radius r_y of the virtual wheel 61_y and a height h_y of each of the reference portion Ps_y and the mass point Ga_y from the floor surface are set to predetermined values (fixed values) set beforehand. The height h_y of each of the reference portion Ps_y and the mass point Ga_y from the floor surface observed in the X-axis direction is the same as the height h_x of each of the reference portion Ps_x and the mass point Ga_x from the floor surface observed in the Y-axis direction. Hereinafter, therefore, h_x=h_y=h will apply.

The positional relationship between the reference portion Ps_x and the mass point Ga_x observed from the Y-axis direction will be supplementarily described. The position of the reference portion Ps_x corresponds to the position of the vehicle system total center of gravity in the case where it is assumed that the rider mounting (sitting) on the rider mounting section 5 is motionless in a predetermined neutral posture relative to the rider mounting section 5. In this case, therefore, the position of the mass point Ga_x agrees with the position of the reference portion Ps_x. The same applies to the positional relationship between the reference portion Ps_y and the mass point Ga_y observed from the X-axis direction.

In practice, however, when the rider on the rider mounting section 5 moves his/her upper body or the like relative to the rider mounting section 5 (or the base body 2), the positions of the actual vehicle system total center of gravity in the X-axis direction and the Y-axis direction will usually shift from the positions of the reference portions Ps_x and Ps_y, respectively, in the horizontal direction. For this reason, the positions of the mass points Ga_x and Ga_y, which are shown in FIG. 5, are shifted from the positions of the reference portions Ps_x and Ps_y, respectively.

The behavior of the vehicle system total center of gravity represented by the inverted pendulum model described above is denoted by the following expressions (1a), (1b), (2a) and (2b). In this case, expressions (1a) and (1b) denote the behaviors observed in the Y-axis direction, while expressions (2a) and (2b) denote the behaviors observed in the X-axis direction.

$$Vb\_x = Vw1\_x + h \cdot \omega b\_x \tag{1a}$$

$$dVb\_x/dt = (g/h) \cdot (\theta b\_x \cdot (h - r\_x) + Ofst\_x) + \omega z \cdot Vb\_y \tag{1b}$$

$$Vb\_y = Vw1\_y + h \cdot \omega b\_y \tag{2a}$$

$$dVb\_y/dt = (g/h) \cdot (\theta b\_y \cdot (h - r\_y) + Ofst\_y) - \omega z \cdot Vb\_x \tag{2b}$$

where Vb_x denotes the velocity of the vehicle system total center of gravity in the X-axis direction (the translational velocity); Vw1_x denotes the moving velocity (the translational velocity) of the virtual wheel 61_x in the X-axis direction; θb_x denotes the tilt angle of the rider mounting section 5 (or the base body 2) in the direction about the Y-axis; ωb_x denotes the temporal change rate of θb_x (=dθb_x/dt); Ofst_x denotes the amount of a shift of the position of the vehicle system total center of gravity in the X-axis direction (the position of the mass point Ga_x in the X-axis direction) from the position of the reference portion Ps_x in the X-axis direction; Vb_y denotes the velocity of the vehicle system total center of gravity in the Y-axis direction (the translational velocity); Vw1_y denotes the moving velocity (the translational velocity) of the virtual wheel 61_y in the Y-axis direction; θb_y denotes the tilt angle of the rider mounting section 5 (or the base body 2) in the direction about the X-axis; ωb_y denotes the temporal change rate of θb_y (=dθb_y/dt); and Ofst_y denotes the amount of shift of the position of the vehicle system total center of gravity in the Y-axis direction (the position of the mass point Ga_y in the Y-axis direction) from the position of the reference portion Ps_y in the Y-axis direction. Further, ωz denotes a yaw rate (the angular velocity in the direction about the yaw axis) when the vehicle 1 turns, and g denotes a gravitational acceleration constant.

The positive direction of θb_x and ωb_x is the direction in which the vehicle system total center of gravity tilts in the positive direction of the X-axis (forward), while the positive direction of θb_y and ωb_y is the direction in which the vehicle system total center of gravity tilts in the positive direction of the Y-axis (leftward). Further, the positive direction of ωz is the counterclockwise direction as the vehicle 1 is observed from above.

The second term of the right side of expression (1a), namely, (=h·ωb_x), denotes the translational velocity component of the reference portion Ps_x in the X-axis direction generated by a tilt of the rider mounting section 5 in the direction about the Y-axis. The second term of the right side of expression (2a), namely, (=h·ωb_y), denotes the translational velocity component of the reference portion Ps_y in the Y-axis direction generated by a tilt of the rider mounting section 5 in the direction about the X-axis.

Supplementarily, Vw1_x in expression (1a) specifically denotes a relative circumferential velocity of the virtual wheel 61_x with respect to the rod 62_x (in other words, with respect to the rider mounting section 5 or the base body 2). Hence, Vw1_x includes a velocity component (=r_x·ωb_x), which is generated when the rod 62_x tilts, in addition to the moving velocity of the ground contact point of the virtual wheel 61_x in the X-axis direction relative to the floor surface, i.e., the moving velocity of the ground contact point of the first travel operation unit 3 in the X-axis direction relative to the floor surface. The same applies to Vw1_y in expression (1b).

Further, the first term of the right side of expression (1b) denotes an acceleration component in the X-axis direction generated at the vehicle system total center of gravity by a component in the X-axis direction (F_x in FIG. 5) of a floor reaction force (F in FIG. 5) acting on the ground contact portion of the virtual wheel 61_x according to the amount of shift (=θb_x·(h−r_x)+Ofst_x) of the position of the vehicle system total center of gravity in the X-axis direction (the position of the mass point Ga_x in the X-axis direction) from the vertical upper position of the ground contact portion of the virtual wheel 61_x (the ground contact portion of the first travel operation unit 3 observed from the Y-axis direction). The second term of the right side of expression (1b) denotes the acceleration component in the X-axis direction generated by a centrifugal force acting on the vehicle 1 at the time of turning at the yaw rate of ωz.

Similarly, the first term of the right side of expression (2b) denotes an acceleration component in the Y-axis direction generated at the vehicle system total center of gravity by a component in the Y-axis direction (F_y in FIG. 5) of a floor reaction force (F in FIG. 5) acting on the ground contact portion of the virtual wheel 61_y according to the amount of deviation (=θb_y·(h−r_y)+Ofst_y) of the position of the vehicle system total center of gravity in the Y-axis direction (the position of the mass point Ga_y in the Y-axis direction) from the vertical upper position of the ground contact portion of the virtual wheel 61_y (the ground contact portion of the first travel operation unit 3 observed from the X-axis direction). The second term of the right side of expression (2b) denotes the acceleration component in the Y-axis direction generated by a centrifugal force acting on the vehicle 1 at the time of turning at the yaw rate of ωz.

Figure 6:
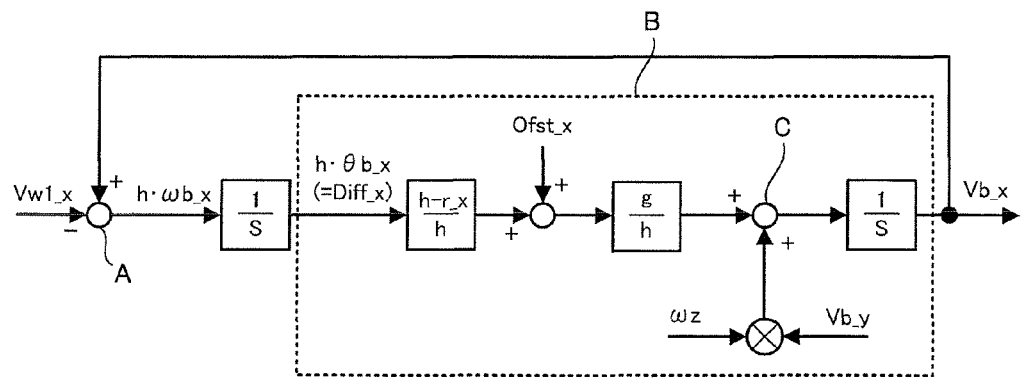
FIG. 6 is a block diagram illustrating behaviors related to the inverted pendulum model shown in FIG. 5.

The behaviors (the behaviors observed in the X-axis direction) represented by expressions (1a) and (1b) described above are illustrated by the block diagram of FIG. 6. In the diagram, 1/s denotes integration operation.

Figure 5:
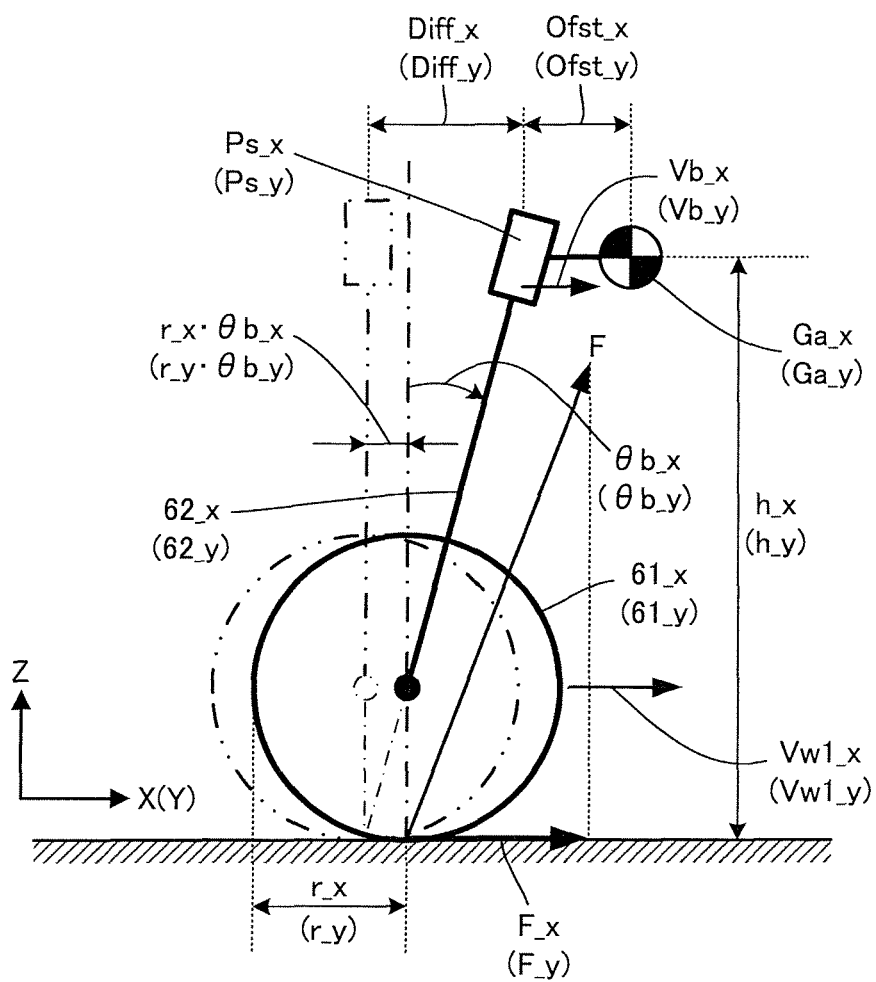
FIG. 5 is a diagram illustrating an inverted pendulum model used for the processing by the first control processor shown in FIG. 3.

Further, the processing by an arithmetic unit indicated by reference character A in FIG. 6 corresponds to the relational expression of expression (1a), while the processing by an arithmetic unit indicated by reference character B corresponds to the relational expression of expression (1b).

h·θb_x in FIG. 6 approximately coincides with Diff_x shown in FIG. 5.

Meanwhile, the block diagram representing the behaviors indicated by expressions (2a) and (2b), i.e., the behaviors observed in the Y-axis direction, is obtained by replacing the suffix "_x" in FIG. 6 by "_y" and by replacing the sign "+" of the acceleration component (the acceleration component generated by the centrifugal force) at the lower side in the drawing, which is one of the inputs to an adder denoted by reference character C, by "−."

According to the present embodiment, the algorithm of the processing by the first control processor 24 is created on the basis of the behavior model (inverted pendulum model) of the vehicle system total center of gravity that considers the centrifugal force and the amount of the shift of the vehicle system total center of gravity from the reference portions Ps_x and Ps_y, as described above.

Based on the above, the processing by the first control processor 24 will be specifically described. In the following description, the set of the value of a variable related to the behavior observed from the Y-axis direction and the value of a variable related to the behavior observed from the X-axis direction will be denoted by adding a suffix "_xy" in some cases.

Referring to FIG. 4, the first control processor 24 first carries out the processing by the operation command converter 31 and the processing by the center of gravity velocity estimator 33 at each arithmetic processing cycle of the controller 21.

Figure 7:
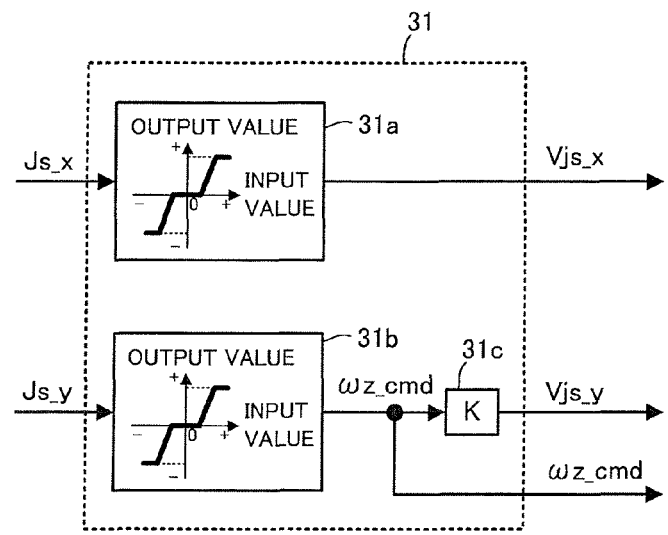
FIG. 7 is a block diagram illustrating the processing by an operation command converter shown in FIG. 4.

As illustrated in FIG. 7, the operation command converter 31 determines a basic velocity command Vjs_xy, which is the basic command value of the travel velocity (the translational velocity) of the first travel operation unit 3, and a basic turn angular velocity command ωjs, which is the basic command value of the angular velocity in the direction about the yaw axis when the vehicle 1 turns, on the basis of the amount of swing of the joystick 12 in the Y-axis direction (i.e., the amount of rotation about the X-axis) Js_y and the amount of swing of the joystick 12 in the X-axis direction (i.e., the amount of rotation about the Y-axis) Js_x.

Of the aforesaid basic velocity command Vjs_xy, the basic velocity command Vjs_x in the X-axis direction is determined by a processor 31a on the basis of the amount of swing of the joystick 12 in the X-axis direction Js_x. More specifically, if the amount of swing Js_x is an amount of swing in the positive direction (an amount of a forward swing), then the basic velocity command in the X-axis direction Vjs_x will be a velocity command for a forward movement direction of the vehicle 1 (a positive velocity command). Further, if the amount of swing Js_x is an amount of swing in the negative direction (an amount of a backward swing), then the basic velocity command in the X-axis direction Vjs_x will be a velocity command for a backward movement direction of the vehicle 1 (a negative velocity command). In this case, the magnitude of the basic velocity command in the X-axis direction Vjs_x is determined such that it increases to a predetermined upper limit value or less as the magnitude of the amount of swing of the joystick 12 in the X-axis direction (the forward or the backward direction) Js_x increases.

A predetermined range in which the magnitude of a swing amount of the joystick 12 in the positive direction or the negative direction Js_x is sufficiently small may be defined as a dead zone, and the basic velocity command in the X-axis direction Vjs_x may be set to zero for a swing amount in the dead zone. The graph shown in the processor 31a in FIG. 7 indicates the relationship between an input (Js_x) and an output (Vjs_x) in the case where the dead zone is involved.

Of the basic velocity commands Vjs_xy, the basic velocity command Vjs_y in the Y-axis direction is determined as the velocity command in the Y-axis direction of the first travel operation unit 3 for a turn of the vehicle 1 on the basis of the a swing amount of the joystick 12 in the Y-axis direction Js_y.

More specifically, if the swing amount Js_y is a swing amount in the negative direction (a rightward swing amount), then the basic velocity command Vjs_y in the Y-axis direction will be a leftward velocity command (a positive velocity command) of the vehicle 1. Further, if the swing amount Js_y is a swing amount in the positive direction (a leftward swing amount), then the basic velocity command Vjs_y in the Y-axis direction will be the rightward velocity command (a negative velocity command) of the vehicle 1. In this case, the magnitude of the basic velocity command in the Y-axis direction Vjs_y is determined such that it increases to a predetermined upper limit value or less as the magnitude of the swing amount of the joystick 12 in the Y-axis direction (rightward or leftward) increases.

More specifically, as illustrated in, for example, FIG. 7, a desired turn angular velocity ωz_cmd, which is the desired value of the angular velocity in the direction about the yaw axis when the vehicle 1 turns, is determined on the basis of the swing amount of the joystick 12 in the Y-axis direction Js_y by the processing carried out by a processor 31b. In this case, if the swing amount of the joystick 12 Js_y is a swing amount in the negative direction (the rightward swing amount), then the desired turn angular velocity ωz_cmd will be an angular velocity command of a right-hand (clockwise) turn, i.e., a negative angular velocity command. If the swing amount of the joystick 12 Js_y is a swing amount in the positive direction (leftward swing amount), then the desired turn angular velocity ωz_cmd will be an angular velocity command of a left-hand (counterclockwise) turn, i.e., a positive angular velocity command. In this case, the magnitude of the desired turn angular velocity ωz_cmd is determined such that it increases to a predetermined upper limit value or less as the magnitude of the swing amount of the joystick 12 in the Y-axis direction increases.

Further, a processor 31c determines the basic velocity command in the Y-axis direction Vjs_y of the first travel operation unit 3 by multiplying the aforesaid desired turn angular velocity ωz_cmd by a negative value K, which is (−1) times a predetermined value (>0) set beforehand as the distance in the X-axis direction between an instantaneous turn center of the vehicle 1 and the ground contact point of the first travel operation unit 3. The instantaneous turn center means the turning center of the vehicle 1 in the direction about the yaw axis at the time when the vehicle 1 makes each turn (the time of each arithmetic processing cycle of the controller 21), i.e., the turning center observed in a coordinate system that moves integrally with the vehicle 1.

Hence, the basic velocity command in the Y-axis direction Vjs_y of the first travel operation unit 3 is determined such that it is proportional to the desired turn angular velocity ωz_cmd, which is determined on the basis of the swing amount in the Y-axis direction Js_y of the joystick 12.

Alternatively, however, regarding the magnitude of the basic velocity command Vjs_y or the desired turn angular velocity ωz_cmd, a predetermined range in which the magnitude of a swing amount of the joystick 12 in the Y-axis direction is sufficiently small may be defined as a dead zone, and the basic velocity command in the Y-axis direction Vjs_y or the desired turn angular velocity ωz_cmd may be set to zero in the case of a swing amount falling in the dead zone. The graph given in the processor 31b in FIG. 7 indicates the relationship between inputs (Js_y) and outputs (ωz_cmd) in the case where the dead zone is involved.

If the joystick 12 is operated in both the X-axis direction (the longitudinal direction) and the Y-axis direction (the lateral direction), then the magnitude of the basic velocity command in the Y-axis direction Vjs_y may be set so as to change according to the swing amount of the joystick 12 in the X-axis direction or the basic velocity command in the X-axis direction Vjs_x.

In the present embodiment, the state in which the desired turn angular velocity ωz_cmd (or the basic velocity command in the Y-axis direction Vjs_y) determined on the basis of the swing operation of the joystick 12 in the Y-axis direction (the lateral direction) is not zero corresponds to a state in which there is the request for turning the vehicle 1. Further, a state in which ωz_cmd (or Vjs_y) is zero corresponds to a state in which there is not the request for turning the vehicle 1.

The center of gravity velocity estimator 33 calculates an estimated value of the velocity of the vehicle system total center of gravity Vb_estm1_xy according to the geometric (kinematic) relationship expressions given by the aforesaid expressions (1a) and (2a) in the inverted pendulum model.

More specifically, as illustrated by the block diagram in FIG. 4, the center of gravity velocity estimator 33 adds up the value of an actual translational velocity Vw1_act_xy of the first travel operation unit 3 and the value, which is obtained by multiplying an actual temporal change rate (tilt angular velocity) ωb_act_xy of a tilt angle θb_xy of the rider mounting section 5 by a height h of the vehicle system total center of gravity so as to calculate the estimated value of the velocity of the vehicle system total center of gravity Vb_estm1_xy.

In other words, the estimated value of the velocity in the X-axis direction Vb_estm1_x of the vehicle system total center of gravity and the estimated value of the velocity in the Y-axis direction Vb_estm1_y thereof are calculated according to the following expressions (3a) and (3b).

$$Vb\_estm1\_x = Vw1\_act\_x + h \cdot \omega b\_act\_x \quad (3a)$$

$$Vb\_estm1\_y = Vw1\_act\_y + h \cdot \omega b\_act\_y \quad (3b)$$

However, the temporal change rate of the offset amount Ofst_xy of the position of the vehicle system total center of gravity from the position of the reference portion Ps_xy (hereinafter referred to as the center of gravity offset amount Ofst_xy) is set to be sufficiently smaller than Vb_estm1_xy so as to be ignorable.

In this case, according to the present embodiment, desired values of the travel velocity Vw1_cmd_x and Vw1_cmd_y (previous values) of the first travel operation unit 3 determined by the posture control arithmetic unit 34 at the previous arithmetic processing cycle are used as the values of Vw1_act_x and Vw1_act_y in the above calculation.

Alternatively, however, the rotational speeds of the electric motors 8a and 8b, for example, may be detected by a rotational velocity sensor, such as a rotary encoder. Further, the latest values of Vw1_act_x and Vw1_act_y (i.e., the latest values of the measurement values of Vw1_act_x and Vw1_act_y) estimated from the detection values may be used for the calculation of expressions (3a) and (3b).

Further, according to the present embodiment, the latest values of the temporal change rates of the measurement values of the tilt angle θb of the rider mounting section 5 based on a detection signal of the tilt sensor 22 (i.e., the latest values of the measurement values of ωb_act_x and ωb_act_y) are used as the values of ωb_act_x and ωb_act_y.

After carrying out the processing by the operation command converter 31 and the center of gravity velocity estimator 33 as described above, the first control processor 24 carries out the processing by a center of gravity offset estimator 35a illustrated in FIG. 4. Thus, the first control processor 24 determines a center of gravity offset amount estimated value Ofst_estm_xy, which is the estimated value of the center of gravity offset amount Ofst_xy.

Figure 8:
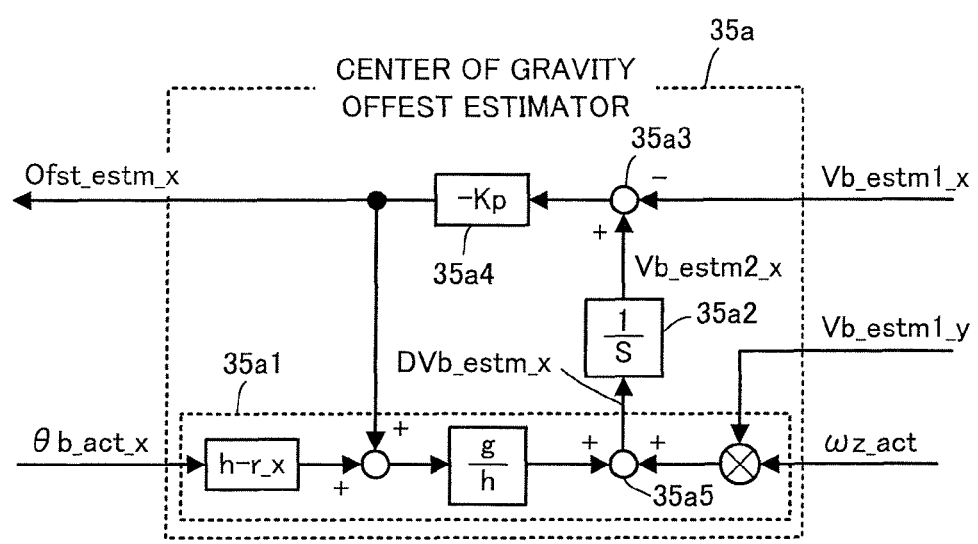
FIG. 8 is a block diagram illustrating the processing by a center of gravity offset estimator shown in FIG. 4.

The processing by the center of gravity offset estimator 35a is the processing indicated by the block diagram of FIG. 8. FIG. 8 representatively illustrates the processing for determining the estimated value of the center of gravity offset amount in the X-axis direction Ofst_estm_x of the center of gravity offset amount estimated value Ofst_estm_xy.

The processing in FIG. 8 will be specifically described. The center of gravity offset estimator 35a carries out the arithmetic processing of the right side of the aforesaid expression (1b) by an arithmetic unit 35a1, using the measurement value (a latest value) of an actual tilt angle in the direction about the Y-axis θb_act_x of the rider mounting section 5 obtained from a detection signal of the tilt sensor 22, the measurement value (a latest value) of an actual yaw rate ωz_act of the vehicle 1 obtained from a detection signal of the yaw rate sensor 23, a first estimated value (a latest value) of the velocity of the vehicle system total center of gravity in the Y-axis direction Vb_estm1_y calculated by the center of gravity velocity estimator 33, and the estimated value of the center of gravity offset amount in the X-axis direction Ofst_estm_x (a previous value) determined at the previous arithmetic processing cycle. Thus, the center of gravity offset estimator 35a calculates an estimated value of the translational acceleration of the vehicle system total center of gravity in the X-axis direction DVb_estm_x.

The center of gravity offset estimator 35a further carries out the processing for integrating the estimated value of the translational acceleration in the X-axis direction DVb_estm_x of the vehicle system total center of gravity by an arithmetic unit 35a2. Thus, the center of gravity estimator 35a calculates a second estimated value of the velocity of the vehicle system total center of gravity in the X-axis direction Vb_estm2_x.

Subsequently, the center of gravity offset estimator 35a carries out the processing for calculating the difference between the second estimated value of the velocity of the vehicle system total center of gravity in the X-axis direction Vb_estm2_x (a latest value) and the first estimated value Vb_estm1_x (a latest value) thereof by an arithmetic unit 35a3.

Then, the center of gravity offset estimator 35a further carries out the processing for multiplying the difference by a gain (−Kp) of a predetermined value by an arithmetic unit 35a4. Thus, the center of gravity estimator 35a determines the latest value of the estimated value of the center of gravity offset amount in the X-axis direction Ofst_estm_x.

The processing for determining the estimated value of the center of gravity offset amount in the Y-axis direction is also carried out in the same manner described above. More specifically, the block diagram illustrating the determination processing can be obtained by replacing the suffix "_x" in FIG. 8 by "_y" and by replacing the sign "+" of the acceleration component (an acceleration component generated by a centrifugal force) at right in the drawing, which is one of the inputs to an adder 35a5, by "−".

The estimated value of the center of gravity offset amount Ofst_estm_xy is determined while sequentially being updated by the aforesaid processing carried out by the center of gravity offset estimator 35a. This makes it possible to converge Ofst_estm_xy to an actual value.

The first control processor 24 then carries out the processing by a center of gravity offset influence amount calculator 35b shown in FIG. 4 to calculate a center of gravity offset influence amount Vofs_xy.

The center of gravity offset influence amount Vofs_xy indicates the deviation of an actual center of gravity velocity from a desired velocity of the vehicle system total center of gravity in the case where the feedback control is conducted in the posture control arithmetic unit 34, which will be discussed hereinafter, without considering the deviation of the position of the vehicle system total center of gravity from the position of the reference portion Ps_xy in the inverted pendulum mode.

To be specific, the center of gravity offset influence amount calculator 35b multiplies each component of a newly determined center of gravity offset amount estimated value Ofst_estm_xy by a value denoted by (Kth_xy/(h_r_xy))/Kvb_xy, thereby calculating the center of gravity offset influence amount Vofs_xy.

Kth_xy denotes a gain value for determining a manipulated variable component which functions to bring the tilt angle of the rider mounting section 5 close to zero, i.e., to a desired tilt angle, in the processing by the posture control arithmetic unit 34, which will be hereinafter discussed. Further, Kvb_xy denotes a gain value for determining a manipulated variable component which functions to bring the difference between a desired velocity of the vehicle system total center of gravity Vb_cmd_xy and the first estimated value of the velocity of the vehicle system total center of gravity Vb_estm1_xy close to zero in the processing carried out by the posture control arithmetic unit 34, which will be hereinafter discussed.

The first control processor 24 then carries out the processing by the center of gravity desired velocity determiner 32 shown in FIG. 4. Thus, the first control processor 24 calculates a restricted center of gravity desired velocity Vb_cmd_xy on the basis of the basic velocity command Vjs_xy determined by the operation command converter 31 and the center of gravity offset influence amount Vofs_xy determined by the center of gravity offset influence amount calculator 35b.

The center of gravity desired velocity determiner 32 first carries out the processing through a processor 32c shown in FIG. 4. The processor 32c carries out dead-zone processing and limiting related to the value of the center of gravity offset influence amount Vofs_xy thereby to determine a desired center of gravity velocity addition amount Vb_cmd_by_ofs_xy as a component based on the center of gravity offset of a desired value of the vehicle system total center of gravity.

More specifically, according to the present embodiment, if the magnitude of the center of gravity offset influence amount in the X-axis direction Vofs_x is a value within a dead zone, which is a predetermined range in the vicinity of zero, i.e., a value that is relatively close to zero, then the center of gravity desired velocity determiner 32 sets the desired center of gravity velocity addition amount in the X-axis direction Vb_cmd_by_ofs_x to zero.

Further, if the magnitude of the center of gravity offset influence amount in the X-axis direction Vofs_x is a value that deviates from the dead zone, then the center of gravity desired velocity determiner 32 determines the desired center of gravity velocity addition amount in the X-axis direction Vb_cmd_by_ofs_x such that the polarity thereof is the same as Vofs_x and the magnitude thereof increases as the magnitude of Vofs_x increases. However, the value of the desired center of gravity velocity addition amount Vb_cmd_by_ofs_x is restricted to the range from a predetermined upper limit value (>0) to a predetermined lower limit value (≤0).

The processing for determining the desired center of gravity velocity addition amount in the Y-axis direction Vb_cmd_by_ofs_y is the same as the processing described above.

Subsequently, the center of gravity desired velocity determiner 32 carries out, by a processor 32d shown in FIG. 4, the processing for determining a desired velocity V1_xy obtained by adding each component of the desired center of gravity velocity addition amount Vb_cmd_by_ofs_xy to each component of the basic velocity command Vjs_xy determined by the operation command converter 31. More specifically, the center of gravity desired velocity determiner 32 determines V1_xy (a set of V1_x and V1_y) by the processing denoted by V1_x=Vjs_x+Vb_cmd_by_ofs_x and V1_y=Vjs_y+Vb_cmd_by_ofs_y.

Further, the center of gravity desired velocity determiner 32 carries out the processing by a processor 32e. The processor 32e carries out limiting for determining a restricted center of gravity desired velocity Vb_cmd_xy (a set of Vb_cmd_x and Vb_cmd_y) as a desired velocity of the vehicle system total center of gravity obtained by restricting the combination of desired velocities V1_x and V1_y in order to prevent the rotational speed of each of the electric motors 8a and 8b constituting the actuator 8 of the first travel operation unit 3 from deviating from a predetermined permissible range.

In this case, if the set of the desired velocities V1_x and V1_y determined by the processor 32d lies within a predetermined region (e.g., an octagonal region) on a coordinate system, in which the axis of ordinate indicates the value of the desired velocity V1_x and the axis of abscissa indicates the value of the desired velocity V1_y, then the desired velocity V1_xy is determined directly as the restricted center of gravity desired velocity Vb_cmd_xy.

Further, if the set of the desired velocities V1_x and V1_y determined by the processor 32d deviates from the predetermined region on the coordinate system, then a set that has been restricted to lie on the boundary of the predetermined region is determined as the restricted center of gravity desired velocity Vb_cmd_xy.

The center of gravity desired velocity Vb_cmd_xy is determined on the basis of the basic velocity command Vjs_xy and the center of gravity offset influence amount Vofs_xy (or the center of gravity offset) as described above. This enables the rider to maneuver the vehicle 1 by operating the operation device, i.e., by operating the joystick 12, and by changing the posture of his/her body, i.e., by shifting his/her weight.

After carrying out the processing by the center of gravity desired velocity determiner 32, the first control processor 24 carries out the processing by the posture control arithmetic unit 34. The posture control arithmetic unit 34 carries out the processing illustrated by the block diagram of FIG. 4 to determine a first desired velocity Vw1_cmd_xy, which is the desired value of the travel velocity (translational velocity) of the first travel operation unit 3.

More specifically, the posture control arithmetic unit 34 first carries out, by the arithmetic unit 34b, the processing for subtracting each component of the center of gravity offset influence amount Vofs_xy from each component of the restricted center of gravity desired velocity Vb_cmd_xy, thereby determining a desired velocity with a compensated center of gravity offset Vb_cmpn_cmd_xy (a latest value).

Subsequently, according to expressions (4a) and (4b) given below, the posture control arithmetic unit 34 calculates a desired translational acceleration in the X-axis direction DVw1_cmd_x and a desired translational acceleration in the Y-axis direction DVw1_cmd_y of a desired translational acceleration DVw1_cmd_xy, which is the desired value of the translational acceleration at the ground contact point of the first travel operation unit 3, by carrying out the processing through the arithmetic units except for the arithmetic unit 34b and an integral arithmetic unit 34a, which carries out integral operations.

$$DVw1\_cmd\_x = Kvb\_x \cdot (Vb\_cmpn\_cmd\_x - Vb\_estm1\_x) - Kth\_x \cdot \theta b\_act\_x - Kw\_x \cdot \omega b\_act\_x \quad (4a)$$

$$DVw1\_cmd\_y = Kvb\_y \cdot (Vb\_cmpn\_cmd\_y - Vb\_estm1\_y) - Kth\_y \cdot \theta b\_act\_y - Kw\_y \cdot \omega b\_act\_y \quad (4b)$$

In expressions (4a) and (4b), Kvb_xy, Kth_xy and Kw_xy denote predetermined gain values set beforehand.

The first term of the right side of expression (4a) denotes a feedback manipulated variable component based on the difference between the compensated center of gravity-offset desired velocity in the X-axis direction Vb_cmpn_cmd_x (a latest value) of the vehicle system total center of gravity and a first estimated value Vb_estm1_x (a latest value), the second term thereof denotes a feedback manipulated variable component based on a measurement value (a latest value) of an actual tilt angle in the direction about the Y-axis θb_act_x of the rider mounting section 5, and the third term thereof denotes a feedback manipulated variable component based on a measurement value (a latest value) of an actual tilt angular velocity in the direction about the Y-axis ωb_act_x of the rider mounting section 5. Further, a desired translational acceleration in the X-axis direction DVw1_cmd_x is calculated as a resultant manipulated variable of the above feedback manipulated variable components.

Similarly, the first term of the right side of expression (4b) denotes a feedback manipulated variable component based on the difference between the compensated center of gravity-offset desired velocity in the Y-axis direction Vb_cmpn_cmd_y (a latest value) of the vehicle system total center of gravity and a first estimated value Vb_estm1_y (a latest value), the second term thereof denotes a feedback manipulated variable component based on a measurement value (a latest value) of an actual tilt angle in the direction about the X-axis θb_act_y of the rider mounting section 5, and the third term thereof denotes a feedback manipulated variable component based on a measurement value (a latest value) of an actual tilt angular velocity in the direction about the X-axis ωb_act_y of the rider mounting section 5. Further, a desired translational acceleration in the Y-axis direction DVw1_cmd_y is calculated as a resultant manipulated variable of the above feedback manipulated variable components.

Subsequently, the posture control arithmetic unit 34 integrates the components of the desired translational acceleration DVw1_cmd_xy by the integral arithmetic unit 34a, thereby determining a first desired velocity Vw1_cmd_xy (a latest value) of the first travel operation unit 3.

Then, the first control processor 24 controls the electric motors 8a and 8b constituting the actuator 8 of the first travel operation unit 3 according to the first desired velocity Vw1_cmd_xy determined as described above. More specifically, the first control processor 24 determines the current command values for the electric motors 8a and 8b by feedback control processing so as to make the actual rotational velocities (measurement values) of the electric motors 8a and 8b follow the desired values of the rotational velocities thereof specified by the first desired velocity Vw1_cmd_xy. The first control processor 24 then energizes the electric motors 8a and 8b according to the current command values.

In a state wherein the restricted center of gravity desired velocity Vb_cmd_xy remains at a fixed value and the motion of the vehicle 1 has been stabilized after the aforesaid processing, i.e., in a state wherein the vehicle 1 is traveling in a straight line at a fixed velocity, the vehicle system total center of gravity lies right above the ground contact point of the first travel operation unit 3. In this state, the actual tilt angle θb_act_xy of the rider mounting section 5 will be −Ofst_xy/(h−r_xy) according to expressions (1b) and (2b). The actual tilt angular velocity ωb_act_xy of the rider mounting section 5 will be zero and the desired translational acceleration DVw1_cmd_xy will be zero. This combined with the block diagram of FIG. 4 lead to the finding of the agreement between Vb_estm1_xy and Vb_cmd_xy.

In other words, the first desired velocity Vw1_cmd_xy of the first travel operation unit 3 is basically determined to converge the difference between the restricted center of gravity desired velocity Vb_cmd_xy of the vehicle system total center of gravity and the first estimated value Vb_estm1_xy to zero.

Further, the rotational speeds of the electric motors 8a and 8b constituting the actuator 8 of the first travel operation unit 3 are controlled so as not to deviate from a predetermined permissible range by the processing carried out by the processor 32e while compensating for the influence on the deviation of the position of the vehicle system total center of gravity from the position of the reference portion Ps_xy in the inverted pendulum model.

This completes the detailed description of the processing by the first control processor 24 in the present embodiment.

The processing by the second control processor 25 will now be described with reference to FIG. 9. The second control processor 25 is roughly constructed of the following functional units. As illustrated in FIG. 9, the second control processor 25 is provided with a basic desired value determiner 41 which determines a basic desired value of the travel velocity (translational velocity) in the Y-axis direction Vw2_cmd1_y of the second travel operation unit 4 for making an actual turn angular velocity ωz_act, which is an actual angular velocity in the direction about the yaw axis when the vehicle 1 turns, follow the aforesaid desired turn angular velocity ωz_cmd, a limiting processor 42 which carries out limitation processing on the basic desired value Vw2_cmd1_y so as to determine a restricted desired value of the travel velocity in the Y-axis direction Vw2_cmd_y of the second travel operation unit 4, a motor controller 43 which controls the energizing current of the electric motor 17, which is an actuator of the second travel operation unit 4, according to the restricted desired value Vw2_cmd_y, and a limit width setter 44 which variably sets the limit width used in the limiting processor 42.

The basic desired value determiner 41, the limiting processor 42, the motor controller 43, and the limit width setter 44 mentioned above correspond to the basic desired value determining unit, the limitation processing unit, the actuator controlling unit, and the limit width setting unit, respectively, in the present invention.

The second control processor 25 first carries out the processing by the basic desired value determiner 41. As illustrated in FIG. 9, the basic desired value determiner 41 carries out the arithmetic processing (arithmetic processing based on feedback control) according to expressions (5a) to (5d) given below by using the observed value (or the substitute estimated value) of the actual travel velocity in the Y-axis direction Vw1_act_y of the first travel operation unit 3, the observed value of the actual turning angular velocity ωz_act, the first desired velocity in the Y-axis direction Vw1_cmd_y of the first travel operation unit 3 determined by the posture control arithmetic unit 34, and the desired turn angular velocity ωz_cmd determined as described above by the operation command converter 31. Thus, the second control processor 25 calculates the basic desired value of the travel velocity in the Y-axis direction Vw2_cmd1_y of the second travel operation unit 4.

$$Vw2\_act\_y = Vw1\_act\_y - L \cdot \omega z\_act \quad (5a)$$

$$Vw2\_cmd\_ff\_y = Vw1\_cmd\_y - L \cdot \omega z\_cmd \quad (5b)$$

$$Vw2\_cmd\_fb\_y = Kw2 \cdot (Vw2\_cmd\_ff\_y - Vw2\_act\_y) \quad (5c)$$

$$Vw2\_cmd1\_y = Vw2\_cmd\_ff\_y + Vw2\_cmd\_fb\_y \quad (5d)$$

where Vw2_act_y of the left side in expression (5a) denotes the actual travel velocity in the Y-axis direction of the second travel operation unit 4; expression (5a) is used to calculate the observed value (or the substitute estimated value) of Vw2_act_y; and L denotes the distance in the X-axis direction between the ground contact point of the first travel operation unit 3 and the ground contact point of the second travel operation unit 4, as described above.

In this case, as the value of Vw1_act_y of the right side of expression (5a), for example, the previous value of the desired value (the first desired value) of the travel velocity in the Y-axis direction Vw1_cmd_y of the first travel operation unit 3 is used as the substitute estimated value of the observed value of Vw1_act_y. Alternatively, for example, the rotational speeds of the electric motor 8b may be detected by a rotational speed sensor, such as a rotary encoder. Further, the value (observed value) of Vw1_act_y estimated from the detection values may be used for the computation of expression (5a).

Further, according to the present embodiment, as the value of ωz_act, the measured value (observed value) of the angular velocity in the direction about the yaw axis on the basis of a detection signal of the yaw rate sensor 23 is used.

Further, Vw2_cmd_ff_y of the left side of expression (5b) is the feedforward component of the basic desired value of the travel velocity in the Y-axis direction Vw2_cmd1_y of the second travel operation unit 4.

If the previous value of Vw1_cmd_y is used as the value of Vw1_act_y, then the value of Vw2_act_y calculated according to expression (5a) corresponds to the substitute estimated value of the observed value of the actual travel velocity in the Y-axis direction of the second travel operation unit 4. If an observed value is used as the value of Vw1_act_y, then the value of Vw2_act_y corresponds to the observed value of the actual travel velocity in the Y-axis direction of the second travel operation unit 4.

Further, Vw2_cmd_fb_y of the left side of expression (5c) is a feedback component for reducing the difference between the feedforward component Vw2_cmd_ff_y and the observed value (or the substitute estimated value) of Vw2_act_y close to zero. In this case, the feedback component Vw2_cmd_fb_y is determined on the basis of the difference between Vw2_cmd_ff_y and the observed value (or the substitute estimated value) of Vw2_act_y according to a feedback control law, such as the proportional rule. In other words, Vw2_cmd_fb_y is calculated by multiplying the difference by a proportional gain Kw2 of a predetermined value established beforehand.

Then, the basic desired value of the travel velocity in the Y-axis direction Vw2_cmd1_y of the second travel operation unit 4 is determined by adding up the feedforward component Vw2_cmd_ff_y and the feedback component Vw2_cmd_fb_y, as indicated by expression (5d).

Thus, the basic desired value Vw2_cmd1_y is determined by the arithmetic processing of the feedback control for reducing the difference between the feedforward component Vw2_cmd_ff_y and the observed value (or the substitute estimated value) of Vw2_act_y close to zero.

In this case, the actual travel velocity in the Y-axis direction Vw1_act_y of the first travel operation unit 3 very closely follows the first desired velocity Vw1_cmd_y. Hence, the basic desired value Vw2_cmd1_y is consequently determined to bring the actual turn angular velocity ωz_act close to the desired turn angular velocity ωz_cmd.

Alternatively, the feedback component Vw2_cmd_fb_y may be calculated by the feedback control processing of the proportional rule or the proportional-differential law or the like on the basis of the difference between the desired turn angular velocity ωz_cmd and the observed value of the actual turn angular velocity ωz_act.

Subsequently, the second control processor 25 carries out the processing by the limit width setter 44. The limit width set by the limit width setter 44 means the permissible maximum value of the magnitude of the difference between the basic desired value Vw2_cmd1_y and the observed value (or the substitute estimated value) of the actual travel velocity in the Y-axis direction Vw2_act_y of the second travel operation unit 4.

Further, the limit width setter 44 calculates the first candidate value and the second candidate value of the limit width by the processing carried out by processors 44a and 44b, respectively.

The processor 44a corresponds to the first candidate value determining unit in the present invention. The processor 44a in the present embodiment multiplies the absolute value of the observed value (or the substitute estimated value) of the actual travel velocity in the Y-axis direction Vw2_act_y of the second travel operation unit 4 or the absolute value of the feedforward component Vw2_cmd_ff_y, whichever value is larger (=max(|Vw2_act_y|, |Vw2_cmd_ff_y|)), by a positive predetermined value Sp_r (<1) established beforehand as a permissible slip ratio (a permissible maximum slip ratio) applied when the second travel operation unit 4 travels in the Y-axis direction. Thus, the processor 44a calculates a first candidate value Δlim1 of the limit width. The first candidate value Δlim1 denotes a limit width for limiting the slip ratio when the second travel operation unit 4 travels in the Y-axis direction to the predetermined value Sp_r or less.

Further, the processor 44b multiplies the absolute value of the observed value or the substitute estimated value of the actual travel velocity in the X-axis direction Vw2_act_x of the second travel operation unit 4 by a tangent (=tan(β)) of a predetermined positive angle value β (<90°) established beforehand as the permissible sideslip angle (the absolute value of a permissible maximum sideslip angle) of the second travel operation unit 4. Thus, the processor 44b calculates a second candidate value Δlim2 of the limit width.

In this case, in the vehicle 1 according to the present embodiment, the travel of the second travel operation unit 4 in the X-axis direction is carried out in a driven manner, following the travel of the first travel operation unit 3 in the X-axis direction. Hence, the actual travel velocity in the X-axis direction Vw2_act_x of the second travel operation unit 4 substantially coincides with the actual travel velocity in the X-axis direction Vw1_act_x of the first travel operation unit 3.

Accordingly to the present embodiment, therefore, the observed value or the substitute estimated value of the actual travel velocity in the X-axis direction Vw1_act_x of the first travel operation unit 3 is used as the value of Vw2_act_x, which is used for calculating the second candidate value Δlim2 (the value of Vw2_act_x corresponding to the substitute estimated value).

In this case, for example, a value estimated from the measured value of the rotational speed of the electric motor 8a detected by a rotational speed sensor, such as a rotary encoder, may be used as the observed value of the actual travel velocity in the X-axis direction Vw1_act_x of the first travel operation unit 3. Further, the previous value of the desired value of the travel velocity in the X-axis direction Vw1_cmd_x of the first travel operation unit 3 may be used as the substitute estimated value of the observed value of Vw1_act_x.

Alternatively, the rotational speed of the second travel operation unit 4 in the direction about the X-axis may be detected by a rotary encoder or the like. Then, the value (observed value) of the travel velocity of the second travel operation unit 4 in the X-axis direction estimated from the detected value may be used as the value of Vw2_act_x thereby to calculate the second candidate value Δlim2.

The second candidate value Δlim2 calculated by the processor 44b as described above denotes the limit width for limiting the sideslip angle of the second travel operation unit 4 to the predetermined value β or less when the vehicle 1 turns while traveling in the X-axis direction.

In the processing by the processor 44b, if the predetermined angle value β is sufficiently small, then the second candidate value Δlim2 may be calculated by multiplying the observed value or the substitute estimated value of Vw2_act_x by β (the value in [rad] angular unit).

Further, the angle value β (permissible sideslip angle) may be changed according to the observed value or the substitute estimated value of the actual travel velocity in the X-axis direction Vw2_act_x of the second travel operation unit 4. In this case, the angle value β is preferably decreased as the absolute value of Vw2_act_x increases.

Then, the limit width setter 44 determines the limit width Δlim by the processor 44c on the basis of the first candidate value Δlim1 and the second candidate value Δlim2 determined as described above and a minimum value Δlim_min, which is a predetermined minimum value of the limit width.

In this case, the processor 44c determines the largest value among Δlim1, Δlim2, and Δlim_min (=max(Δlim1, Δlim2, Δlim_min)) as the limit width Δlim.

Thus, basically, the first candidate value Δlim1 or the second candidate value Δlim2, whichever is larger, is set as the limit width Δlim. In this case, however, the limit width Δlim is restricted to a value equal to or larger than the minimum value Δlim_min, so that if Δlim1 or Δlim2, whichever is larger, is smaller than Δlim_min, then Δlim_min is set as the limit width Δlim.

Subsequently, the limit width setter 44 determines, by processors 44d and 44e, the upper limit value and the lower limit value, respectively, which are used by the limiting processor 42. To be more specific, the processor 44d adds the limit width Δlim to the observed value or the substitute estimated value of the actual travel velocity in the Y-axis direction Vw2_act_y of the second travel operation unit 4 thereby to calculate the upper limit value.

The processor 44e calculates the lower limit value by subtracting the limit width Δlim from the observed value or the substitute estimated value of Vw2_act_y.

This completes the detailed description of the processing by the limit width setter 44. The processing by the processors 44d and 44e may alternatively be carried out by the limiting processor 42.

It is not necessarily required to determine both the upper limit value and the lower limit value for each control processing cycle. More specifically, if the basic desired value Vw2_cmd1_y is larger than the observed value or the substitute estimated value of the actual travel velocity Vw2_act_y, then only the upper limit value may be determined. If the basic desired value Vw2_cmd1_y is smaller than the observed value or the substitute estimated value of the actual travel velocity Vw2_act_y, then only the lower limit value may be determined.

Further alternatively, the limit width Δlim for the upper limit value and the limit width Δlim for the lower limit value may be determined to take different values.

After carrying out the processing by the basic desired value determiner 41 and the limit width setter 44 as described above, the second control processor 25 carries out the processing by the limiting processor 42. The limiting processor 42 compares the basic desired value Vw2_cmd1_y determined by the basic desired value determiner 41 with the upper limit value (=Vw2_act_y+Δlim) and the lower limit value (=Vw2_act_y−Δlim).

If the basic desired value Vw2_cmd1_y falls within the permissible range defined by the upper limit value and the lower limit value, then the limiting processor 42 adopts the basic desired value Vw2_cmd1_y directly as the restricted desired value Vw2_cmd_y.

If the basic desired value Vw2_cmd1_y is larger than the upper limit value or smaller than the lower limit value, then the limiting processor 42 applies the upper limit value or the lower limit value as the restricted desired value Vw2_cmd_y.

Thus, the restricted desired value Vw2_cmd_y is determined such that the magnitude of the difference from the observed value or the substitute estimated value of Vw2_act_y is restricted to the limit width Δlim or less. In other words, if the magnitude of the difference between the basic desired value Vw2_cmd1_y and the observed value or the substitute estimated value of Vw2_act_y is the limit width Δlim or less, then the restricted desired value Vw2_cmd_y is determined to coincide with the basic desired value Vw2_cmd1_y. If the magnitude of the difference between the basic desired value Vw2_cmd1_y and the observed value or the substitute estimated value of Vw2_act_y exceeds the limit width Δlim, then the restricted desired value Vw2_cmd_y is determined by restricting the magnitude of the difference from the observed value or the substitute estimated value of Vw2_act_y such that the magnitude of the difference coincides with the limit width Δlim.

Subsequently, the second control processor 25 carries out the processing by the motor controller 43. The motor controller 43 controls the energizing current of the electric motor 17 serving as the second actuator (i.e., the driving force of the second travel operation unit 4 in the Y-axis direction) so as to cause the actual travel velocity in the Y-axis direction Vw2_act_y of the second travel operation unit 4 to follow the restricted desired value Vw2_cmd_y.

To be more precise, the motor controller 43 determines a current command value Iw2_cmd for the electric motor 17 according to the feedback control law, such as the proportional rule, on the basis of the difference between the restricted desired value Vw2_cmd_y and the observed value or the substitute estimated value of the actual travel velocity in the Y-axis direction Vw2_act_y of the second travel operation unit 4. More specifically, the motor controller 43 multiplies the difference (Vw2_cmd_y−Vw2_act_y) by a predetermined gain value K2 (proportional gain) set beforehand so as to determine the current command value Iw2_cmd according to expression (6) given below.

$$Iw2\_cmd = K2 \cdot (Vw2\_cmd\_y - Vw2\_act\_y) \quad (6)$$

In this case, the value (the latest value) calculated according to the above expression (5a) by the basic desired value determiner 41 is used as the value (the observed value or the substitute estimated value) of Vw2_act_y. The current command value Iw2_cmd may be determined according to, for example, the proportional-differential law (PD law) in place of the proportional rule.

Then, the motor controller 43 controls the actual energizing current of the electric motor 17 through a motor driver (motor driver circuit) on the basis of the current command value Iw2_cmd.

Thus, the actual travel velocity in the Y-axis direction Vw2_act_y of the second travel operation unit 4 is controlled to follow the restricted desired value Vw2_cmd_y.

In a situation wherein no turning command has been issued from the joystick 12 (a situation wherein the desired turn angular velocity ωz_cmd is zero), the restricted desired value Vw2_cmd_y, which is the desired value of the travel velocity in the Y-axis direction of the second travel operation unit 4, is basically determined by the control processing carried out as described above by the second control processor 25 to coincide with the first desired velocity Vw1_cmd_y in the Y-axis direction (the latest value) of the first travel operation unit 3.

Further, in a situation wherein the turning command has been issued from the joystick 12 (a situation wherein the desired turn angular velocity ωz_cmd is not zero), the restricted desired value Vw2_cmd_y is basically determined such that it converges to a feedforward component Vw2_cmd_ff_, which is obtained by adding a velocity component for turning on the basis of the desired turn angular velocity ωz_cmd (=−L·ωz_cmd) to the desired value of the travel velocity in the Y-axis direction (the first desired velocity) Vw1_cmd_y of the first travel operation unit 3 (such that the actual turn angular velocity ωz_act converges to the desired turn angular velocity ωz_cmd). This causes the vehicle 1 to turn.

Further, the restricted desired value Vw2_cmd_y is appropriately restricted such that the magnitude of the difference from the actual travel velocity in the Y-axis direction Vw2_act_y of the second travel operation unit 4 is equal to or less than the limit width Δlim set by the limit width setter 44 as described above.

This completes the detailed description of the processing carried out by the second control processor 25.

The vehicle 1 according to the present embodiment described above enables the translational travel of the vehicle 1 in the X-axis direction to be accomplished in response to a longitudinal tilt (in the X-axis direction) of the rider mounting section 5 (or the base body 2) caused by the movement of the body of the rider on the rider mounting section 5 or in response to the operation of swinging the joystick 12 in the longitudinal direction.

The translational travel of the vehicle 1 in the Y-axis direction can be also accomplished in response to a lateral tilt (in the Y-axis direction) of the rider mounting section 5 (or the base body 2).

Further, combining the aforesaid translational travels enables the vehicle 1 to translationally travel in an arbitrary direction at an angle relative the X-axis direction and the Y-axis direction.

A turn (the change of direction) of the vehicle 1 can be also made according to a turn command output in response to the operation of swinging the joystick 12 in the lateral direction.

Accordingly, the translational travel and the turn of the vehicle 1 can be easily made without the need for a complicated operation of an operation device, such as the joystick 12, or a complicated motion of the body of a rider.

When the vehicle 1 turns, the restricted desired value Vw2_cmd_y, which is the target to be followed by the actual travel velocity in the Y-axis direction Vw2_act_y of the second travel operation unit 4, is restricted, as necessary, such that the magnitude of the difference from the actual travel velocity in the Y-axis direction Vw2_act_y of the second travel operation unit 4 remains to be equal to or less than the limit width Δlim set as described above by the limit width setter 44. Therefore, in the case where the magnitude of the difference between the basic desired value Vw2_cmd1_y for bringing the actual turn angular velocity ωz_act close to the desired turn angular velocity ωz_cmd and the actual travel velocity Vw2_act_y is likely to become excessive due to a slip of the second travel operation unit 4, the restricted desired value Vw2_cmd_y of the second travel operation unit 4 is restricted. Thus, it is possible to prevent the occurrence of an undue slip of the second travel operation unit 4.

In this case, in a situation wherein the actual travel velocity of the vehicle 1 in the X-axis direction (=the actual travel velocity in the X-axis direction Vw1_act_x of the first travel operation unit 3) is zero or low, the limit width Δlim is basically determined to coincide with the minimum limit width Δlim_min or the first candidate value Δlim1, whichever is larger.

Basically, therefore, the restricted desired value Vw2_cmd_y of the second travel operation unit 4 is determined such that the slip ratio at the time when the second travel operation unit 4 travels in the Y-axis direction remains to be equal to or less than the permissible slip ratio Sp_r. This allows the slip ratio of the second travel operation unit 4 to remain within a proper range. As a result, it is possible to securely prevent the occurrence of an undue slip of the second travel operation unit 4.

Further, if the magnitude of the actual travel velocity in the Y-axis direction Vw2_act_y of the second travel operation unit 4 is small at the time when, for example, the vehicle 1 starts turning, then the limit width Δlim is the minimum limit width Δlim_min or more and determined mainly on the basis of the feedforward component Vw2_cmd_ff_y. This makes it possible to prevent the restricted desired value Vw2_cmd_y from being unduly restricted in relation to the basic desired value Vw2_cmd1_y, thus permitting a smooth turning start of the vehicle 1.

Further, in the case where, for example, the vehicle 1 is turned while moving it forward in the X-axis direction at a certain velocity or more, the limit width Δlim is basically determined to coincide with the minimum width Δlim_min or the second candidate value Δlim2, whichever is larger.

This arrangement basically allows the sideslip angle of the second travel operation unit 4 to remain within a proper range. Hence, it is possible to securely prevent the occurrence of an undue slip of the second travel operation unit 4. Further, it is possible to prevent the sideslip angle of the second travel operation unit 4 from being unduly restricted by the first candidate value Δlim1, which restricts the slip ratio. Thus, a lateral force, which is required for the vehicle 1 to turn, can be properly secured. This enables the vehicle 1 to smoothly turn while traveling forward.

Several modified forms of the aforesaid embodiments will now be described.

In the embodiments described above, the joystick 12 has been used as the operation device for outputting turn commands and the like. Alternatively, however, a trackball or a touch-pad may be used in place of a joystick, or a load sensor adapted to detect a place that comes in contact with a rider or a posture sensor or the like held by a rider may be used instead of the joystick. Further alternatively, a portable terminal, such as a smartphone, may be used as the operation device.

Further, the lateral travel velocities of a first travel operation unit 3 and a second travel operation unit 4 of the vehicle 1 may be controlled to cause a vehicle 1 to turn, as necessary, in response to the movement of the center of gravity of the rider in the lateral direction (i.e., a tilt of the rider mounting section 5 in the direction about the X-axis). For example, if the magnitude of the estimated value of the center of gravity offset amount in the Y-axis direction Ofst_estm_y or the center of gravity offset influence amount Vofs_y or the magnitude of the desired value of the travel velocity in the Y-axis direction Vw1_cmd_y of the first travel operation unit 3 reaches a predetermined value or more, then it may be determined that the rider wishes to turn the vehicle 1. In this case, the lateral travel velocities of the first travel operation unit 3 and the second travel operation unit 4 of the vehicle 1 may be controlled to cause the vehicle 1 to turn.

Further, in the embodiment described above, the limit width setter 44 of the second control processor 25 determines, as the limit width Δlim, the largest value among the first candidate value Δlim1, the second candidate value Δlim2 and the minimum limit width Δlim_min. Alternatively, however, the first candidate value Δlim1 or the minimum limit width Δlim_min, whichever is larger, may be determined as the limit width Δlim, or the second candidate value Δlim2 or the minimum limit width Δlim_min, whichever is larger, may be determined as the limit width Δlim.

Further alternatively, the first candidate value Δlim1 may be determined on the basis of only the observed value or the substitute estimated value of the actual travel velocity in the Y-axis direction Vw2_act_y of the second travel operation unit 4. In other words, the value obtained by multiplying the observed value or the substitute estimated value of Vw2_act_y by the permissible slip ratio Sp_r may be determined as the first candidate value.

Further, in the embodiments described above, the first turn angular velocity ωz_act of the vehicle 1 has been fed back to the desired turn angular velocity ωz_cmd. However, this feedback control processing may be omitted. For example, the proportional gain Kw2 in the above expression (5c) may be set to zero, and the feedforward component Vw2_cmd_ffy may be determined as the basic desired value Vw2_cmd1_y.

Further, the second travel operation unit 4 in the aforesaid embodiments has been the omniwheel formed of a pair of annular core members and a plurality of rollers 13 externally inserted therein. Alternatively, however, the second travel operation unit 4 may be constituted of a single annular core member and a plurality of rollers externally inserted therein. The second travel operation unit 4 may alternatively have, for example, the same construction as that of the first travel operation unit 3, instead of using the omniwheel.

Further, in the aforesaid first embodiment, the first desired velocity in the Y-axis direction Vw1_cmd_y of the first travel operation unit 3 at the time of turning may be restricted to a relatively low velocity in the case where the magnitude of the first desired velocity in the X-axis direction Vw1_cmd_x is relatively large. This permits improved maneuverability of the vehicle 1 at the time of turning.

What is claimed is:

1. An inverted pendulum type vehicle having at least a first travel operation unit capable of traveling on a floor surface, a first actuator that drives the first travel operation unit, a base body to which the first travel operation unit and the first actuator are installed, and a rider mounting section attached to the base body such that the rider mounting section is tiltable relative to a vertical direction, wherein the first travel operation unit is configured to be capable of traveling in all directions, including a longitudinal direction and a lateral direction relative to a rider on the rider mounting section, by a driving force of the first actuator, the inverted pendulum type vehicle comprising:

a second travel operation unit, which is connected to the first travel operation unit or the base body spaced from the first travel operation unit in the longitudinal direction and which is configured to be capable of traveling in all directions on a floor surface;

a second actuator which generates a driving force for causing the second travel operation unit to travel at least in the lateral direction; and a control unit, which controls the first actuator and the second actuator so as to cause the first travel operation unit and the second travel operation unit to carry out travel motions thereof according to at least a tilt of the rider mounting section and to set the travel velocities of the first travel operation unit and the second travel operation unit in the lateral direction to be different from each other in a case where there is a request for turning the inverted pendulum type vehicle, wherein the control unit comprises a basic desired value determining unit which determines a basic desired value of a travel velocity of the second travel operation unit in the lateral direction on the basis of at least a desired value of an angular velocity in a direction about a yaw-axis of the inverted pendulum type vehicle determined according to the request at least at the time of turning of the inverted pendulum type vehicle, a limitation processing unit configured to determine a restricted desired value as a value obtained by restricting the basic desired value by limitation processing for restricting a magnitude of a difference before limitation, which is a difference between the basic desired value and an observed value or a substitute estimated value of the observed value of a lateral actual travel velocity, which is an actual travel velocity of the second travel operation unit in the lateral direction, to a magnitude of a predetermined limit width or less, an actuator control unit which controls the second actuator on the basis of the restricted desired value, and a limit width setting unit configured to variably set the limit width such that the limit width is changed according to at least the observed value of an actual travel velocity of the second travel operation unit or the substitute estimated value of the observed value.

2. The inverted pendulum type vehicle according to claim 1, wherein the basic desired value determining unit is configured to determine the basic desired value by using feedback control processing for reducing an angular velocity difference, which is a difference between the desired value of the angular velocity and an observed value of an actual value of the angular velocity, close to zero.

3. The inverted pendulum type vehicle according to claim 2, wherein the basic desired value determining unit is a unit that determines the basic desired value by adding up a feedforward component of the basic desired value determined on the basis of at least the desired value of the angular velocity and a feedback component of the basic desired value determined by feedback control processing for reducing the angular velocity difference close to zero, and the limit width setting unit sets the limit width such that the limit width is changed on the basis of at least one of the observed value of the lateral actual travel velocity or the substitute estimated value of the observed value and the feedforward component.

4. The inverted pendulum type vehicle according to claim 3, wherein the limit width setting unit sets the limit width such that the limit width is changed on the basis of one of the observed value of the lateral actual travel velocity or the substitute estimated value of the observed value and the feedforward component, whichever has a larger absolute value.

5. The inverted pendulum type vehicle according to claim 3, wherein the limit width setting unit sets the limit width such that the limit width increases as one of an absolute value of the observed value of the lateral actual travel velocity or the substitute estimated value of the observed value and an absolute value of the feedforward component, whichever has a larger absolute value, increases.

6. The inverted pendulum type vehicle according to claim 3, wherein the limit width setting unit sets the limit width such that the limit width is changed on the basis of at least one of the observed value of the lateral actual travel velocity or the substitute estimated value of the observed value and the feedforward component and the observed value of a longitudinal actual travel velocity, which is the actual travel velocity of the second travel operation unit in the longitudinal direction, or the substitute estimated value of the observed value.

7. The inverted pendulum type vehicle according to claim 6, wherein the limit width setting unit has a first candidate value determining unit configured to determine a first candidate value of the limit width on the basis of at least one of the observed value of the lateral actual travel velocity or the substitute estimated value of the observed value and the feedforward component and a second candidate value determining unit configured to determine a second candidate value of the limit width on the basis of the observed value of the longitudinal actual travel velocity or the substitute estimated value of the observed value, and sets the limit width to a magnitude equal to or more than the first candidate value or the second candidate value, whichever is larger.

8. The inverted pendulum type vehicle according to claim 7, wherein the first candidate value determining unit determines the first candidate value such that the first candidate value increases as one of an absolute value of the observed value of the lateral actual travel velocity or the substitute estimated value of the observed value and an absolute value of the feedforward component, whichever is larger, increases, and
the second candidate value determining unit determines the second candidate value such that the second candidate value increases as an absolute value of the observed value of the longitudinal actual travel velocity or the substitute estimated value of the observed value increases.

9. The inverted pendulum type vehicle according to claim 1, wherein the limit width setting unit sets the limit width such that the limit width is changed on the basis of at least the observed value of the lateral actual travel velocity or the substitute estimated value of the observed value.

10. The inverted pendulum type vehicle according to claim 9, wherein the limit width setting unit sets the limit width such that the limit width increases as an absolute value of the observed value of the lateral actual travel velocity or the substitute estimated value of the observed value increases.

11. The inverted pendulum type vehicle according to claim 1, wherein the limit width setting unit sets the limit width such that the limit width is changed on the basis of the observed value of the lateral actual travel velocity or the substitute estimated value of the observed value, and an observed value of a longitudinal actual travel velocity, which is an actual travel velocity of the second travel operation unit in the longitudinal direction, or a substitute estimated value of the observed value.

12. The inverted pendulum type vehicle according to claim 11, wherein the limit width setting unit has a first candidate value determining unit which determines a first candidate value of the limit width on the basis of the observed value of the lateral actual travel velocity or the substitute estimated value of the observed value and a second candidate value determining unit which determines a second candidate value of the limit width on the basis of the observed value of the longitudinal actual travel velocity or the substitute estimated value of the observed value, and sets the limit width to a magnitude equal to or more than the first candidate value or the second candidate value, whichever is larger.

13. The inverted pendulum type vehicle according to claim 12, wherein the first candidate value determining unit determines the first candidate value such that the first candidate value increases as the absolute value of the observed value of the lateral actual travel velocity or the substitute estimated value of the observed value increases, and
the second candidate value determining unit determines the second candidate value such that the second candidate value increases as the absolute value of the observed value of the longitudinal actual travel velocity or the substitute estimated value of the observed value increases.

14. The inverted pendulum type vehicle according to claim 1, wherein the limit width setting unit sets the limit width such that the limit width is changed on the basis of at least an observed value of a longitudinal actual travel velocity, which is an actual travel velocity of the second travel operation unit in the longitudinal direction or a substitute estimated value of the observed value.

15. The inverted pendulum type vehicle according to claim 14, wherein the limit width setting unit sets the limit width such that the limit width increases as an absolute value of the observed value of the longitudinal actual travel velocity or the substitute estimated value of the observed value increases.

16. The inverted pendulum type vehicle according to claim 1, wherein the limit width setting unit sets the limit width such that the limit width is restricted to a value that is larger than zero and has a magnitude equal to or more than a predetermined minimum limit width.

* * * * *